[11] 3,589,812

[72] Inventors Andre Malakoff, Seine;
Eliane Guillemet, Asnieres, Seine, both of, France
[21] Appl. No. 767,600
[22] Filed Aug. 29, 1968
[45] Patented June 29, 1971
[73] Assignee Etat Francais (French State) represented by the Minister of the Armies Ministerial Delegation for Armament Central Direction of Manufactures and Navy Arms, Technical Service for Manufactures and Navy, Paris, France
[32] Priority Nov. 12, 1963
[33] France
[31] 953,351
Continuation-in-part of application Ser. No. 410,208, Nov. 10, 1964, now abandoned.

[54] PROCESSES AND DEVICES FOR MEASURING STRESSES WITHIN A TRANSPARENT BODY FOR ELECTROMAGNETIC WAVES
6 Claims, 28 Drawing Figs.
[52] U.S. Cl. .................................................. 356/33, 73/88, 350/149, 356/114, 250/225
[51] Int. Cl. ................................................ G01b 11/18, G01n 21/44
[50] Field of Search ....................................... 356/114- —119, 32, 33; 73/88; 350/149

References Cited
UNITED STATES PATENTS
3,183,763    5/1965    Koester .................... 356/15
FOREIGN PATENTS
1,018,002    1/1966    Great Britain ............ 73/88 (O)
OTHER REFERENCES
Weissberger, A., "Physical Methods Of Organic Chemistry," 1960, part three pp. 2125— 8.

*Primary Examiner*—Ronald L. Wibert
*Assistant Examiner*—J. Rothenberg
*Attorney*—Kurt Kelman

ABSTRACT: The principle of polarization of scattered light is applied to determine the principal stresses in the interior of a model. On the basis of the theorem which states that "a series of birefringent elements is equivalent to a unique birefringent, followed by a medium endowed with light-rotating power," it is shown that, if the characteristics of a series of birefringent elements are known, it is possible to find the characteristics of an interior section of a model. The desired characteristics are obtained by measuring the A.C. component of the signal from a photomultiplier on which the light to be studied, falls, the light having previously passed through an analyzer rotating at a constant speed about the axis of observation. This new method of measurement is applied to both two- and three-dimensional photoelastic models.

FIG.23

PATENTED JUN29 1971     SHEET 1 OF 9     3,589,812
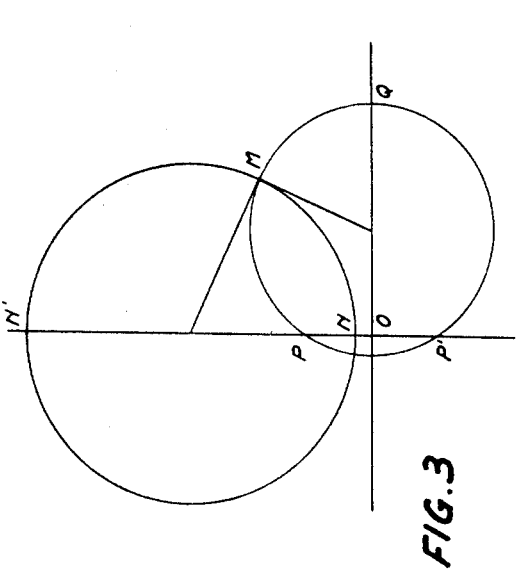
FIG.3
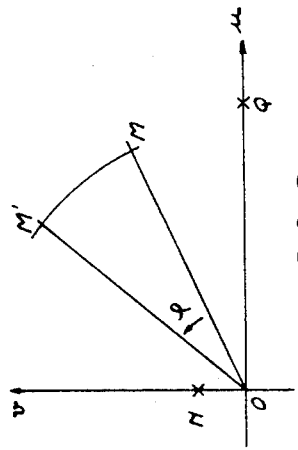
FIG.6
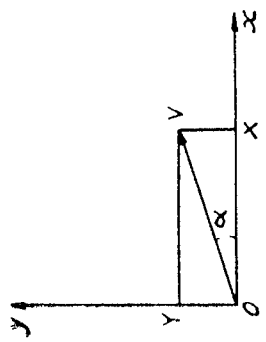
FIG.5
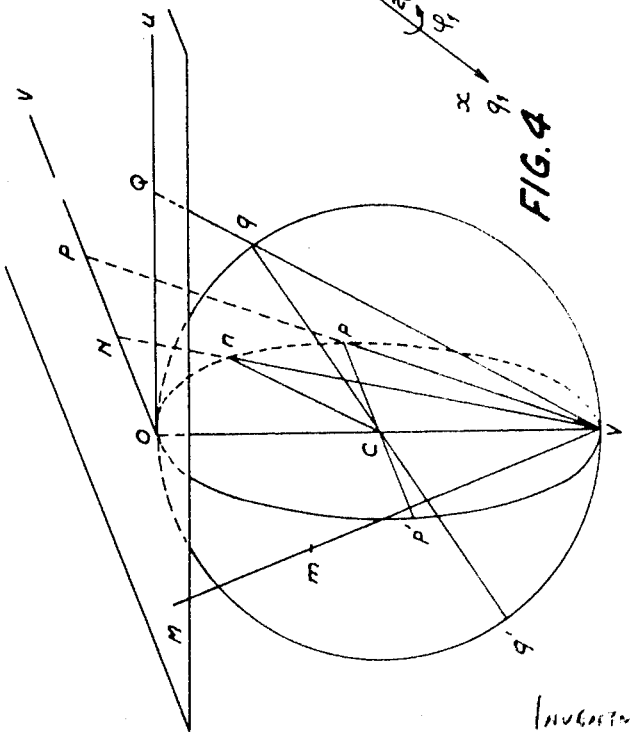
FIG.2
FIG.1
FIG.4
INVENTORS.
ANDRÉ ROBERT
ELIANE GUILLEMET
BY Kurt Kelman
Agent

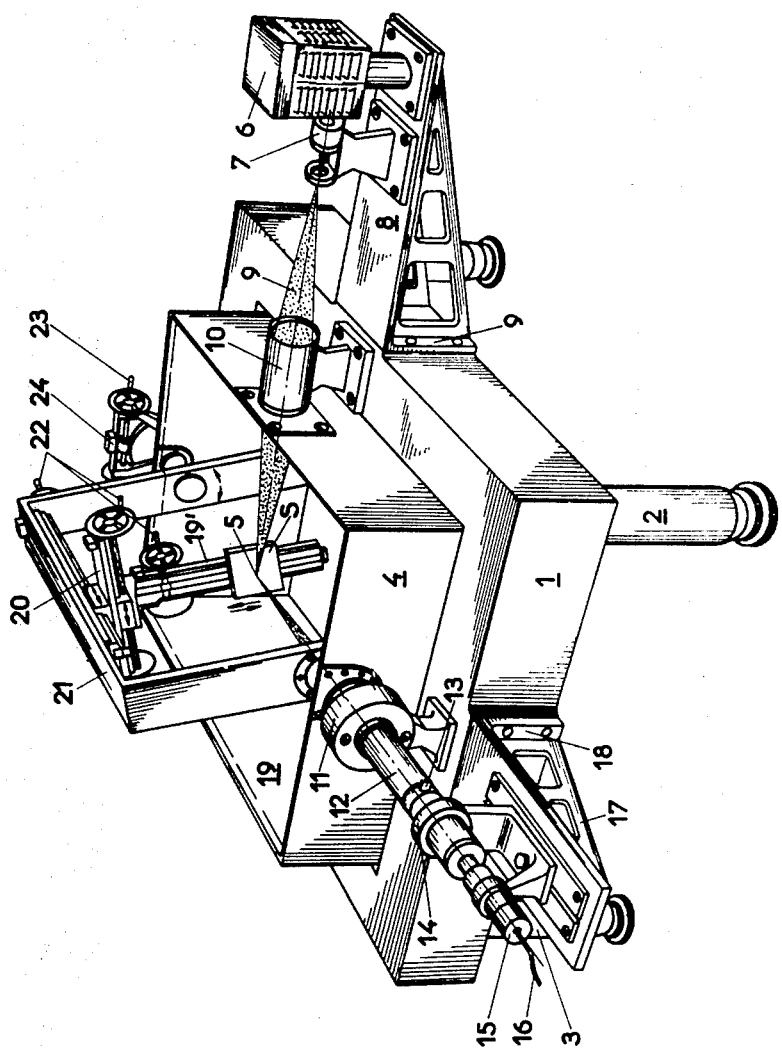

3,589,812

1

PROCESSES AND DEVICES FOR MEASURING STRESSES WITHIN A TRANSPARENT BODY FOR ELECTROMAGNETIC WAVES

REFERENCE TO COPENDING APPLICATION

This invention is a continuation-in-part of our application Ser. No. 410,208, filed Nov. 10, 1964, and now abandoned entitled "Process and Devices for Measuring Stresses Within a Transparent Body for Electromagnetic Waves."

BACKGROUND OF THE INVENTION

The use of scattered-light principles for stress analysis has long been known in the art. The appearance of interference fringes in the light scattered from a polarized beam passing through a stresses photoelastic model has been proven by numerous investigations. R. Weller in "Three-Dimensional Photoelasticity Using Scattered Light," *Journal of Applied Physics*, Vol. 12, Aug. 1941, first presented the technique of determining stresses in a system by using a beam of polarized light which has been collimated and passed through a slit onto a model. The light emerging from the model contained interference fringes from which the stresses could be determined by measuring the spacing of the fringes. Later work further refined and developed this concept. H. T. Jessop in "The Scattered Light Method of Exploration of Stresses in Two and Three Dimensional Models,", Brit. Journal of Appl Phys., Vol. 2, Sept. 1951, further refined this concept and provided an improved light source and improved measuring means whereby higher degrees of accuracy were obtainable.

The same scattered-light photoelastic polariscope method was later refined to include an immersion tank capable of moving the model in three-dimension space (Y.F. Cheng, "Scattered Light Photoelastic Polariscope for Three Dimensional Stress Analysis" *Revue of Sci. Inst.*, Vol. 35, No. 8, Aug. 1964). This study also included a technique of observing simultaneously the intensities of the scattered light along two directions of observation making an angle of 45° in a plane normal to the beam.

However, all the prior art schemes employed polarized light as the impinging light source. Furthermore, these schemes all made measurements on the fringe patterns which were observed. These were basically subjective measurements on scalar intensities. None of the prior art methods made use of the form of the polarized light emerging from the model and none were capable of providing objective measurements which could be automated and computerized.

In this invention, the incoming light in nonpolarized. Despite this departure from prior art schemes, this invention can still provide complete stress analysis. This is accomplished by making use of the form of light which emerges from the model. Based on the properties of elliptically polarized scattered light represented by Poincare's sphere, there can be determined the relations between the axes and the phase difference of the initial light vibration and the emergent one after transmission through a series of birefringent elements.

Although polarization analyzers are known in the art, e.g. U.S. Pat. No. 3,183,763 to Koestler, "Polarization Analyzers for Optical Systems Employing Polarized Light," these devices are not used in the instant invention. As hereinafter described, the invention measures directly the light shape and its properties.

The basic idea of this invention is to use scattering of nonpolarized incident light to produce the equivalent of a movable internal source of polarized light. Measurement of the form of light at the exit of this scattered light at 90° from the main incident beam gives all the available photoelastic information about the stress pattern along the path of this scattered beam. One then has to perform algebraic calculation on the group of forms of polarized light. As such, this invention teaches an entirely objective method supplying all needed data in a form suitable for automatic evaluation of stresses, heretofore not possible in the prior art.

2

In order that the nature and the scope of the present invention be well understood, there will be first described the theoretical basis on which the invention rests and then there will be described nonlimiting embodiments of the invention.

For this purpose, reference will be made to the annexed drawings in which:

FIG. 1 represents a rectilinear vibration with respect to two rectangular axes.

FIG. 2 represents the variation of the flattening and of the orientation of the ellipse resulting from the composition of two vibrations directed along the axes of a birefringent body.

FIG. 3 represents a geometrical construction for obtaining the loci of the flattening constant $\tau =$ a constant and the orientation angle $\theta =$ a constant.

FIG. 4 shows Poincare's sphere as applied to elliptically polarized light.

FIG. 5 provides definitions for a number of angles.

FIG. 6 represents the case of a scattered-light beam with an impinging nonpolarized light beam.

Figure 7:
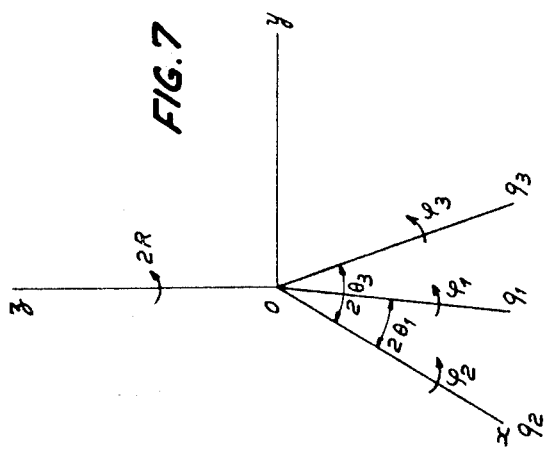

FIG. 7 represents in a Cartesian coordinate system some magnitudes useful for the description.

Figure 8:
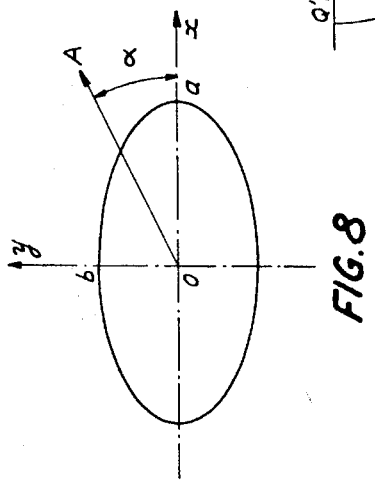

FIG. 8 represents an elliptical luminous vibration having $a$ and $b$ as half axes.

Figure 9:
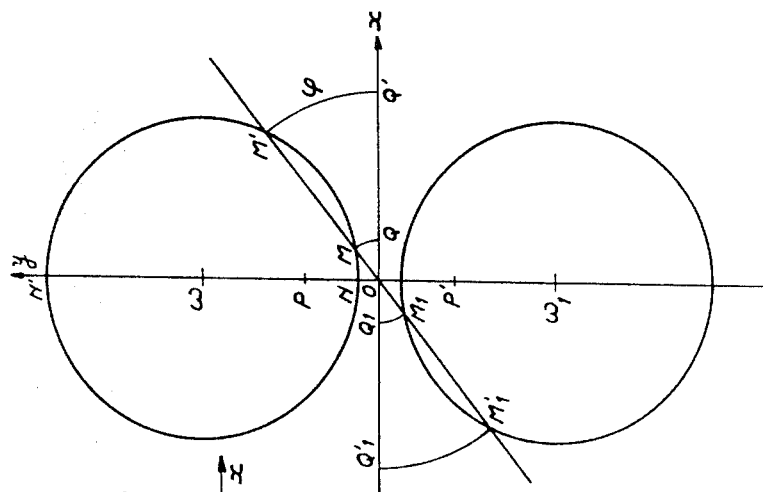

FIG. 9 represents a geometrical construction used in the explanation of the invention.

Figure 11:
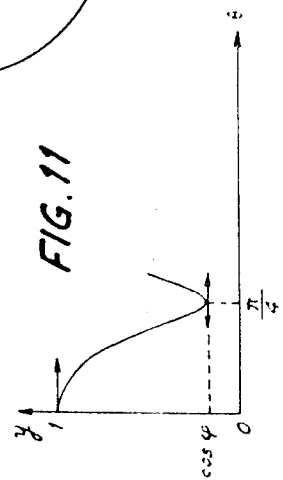
Figure 10:
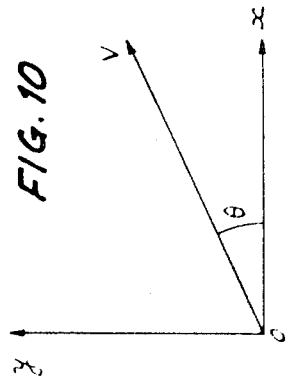
Figure 12:
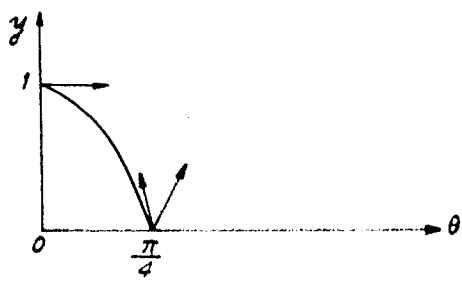

FIGS. 10, 11 and 12 represent, on the one hand, a light vibration and, on the other hand, the variation of a magnitude linked to the flattening coefficient $\tau$ of the ellipse of the vibration considered as a function of the angle $\theta$ characterizing the position of the polarizer.

Figure 13:
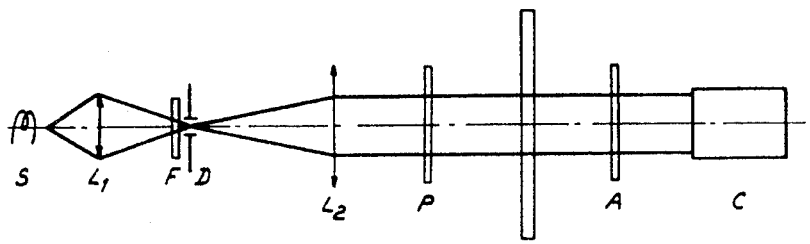

FIG. 13 represents schematically an embodiment of the present invention for studying and measuring mechanical stresses within a plane model stresses it its own plane.

Figure 14:
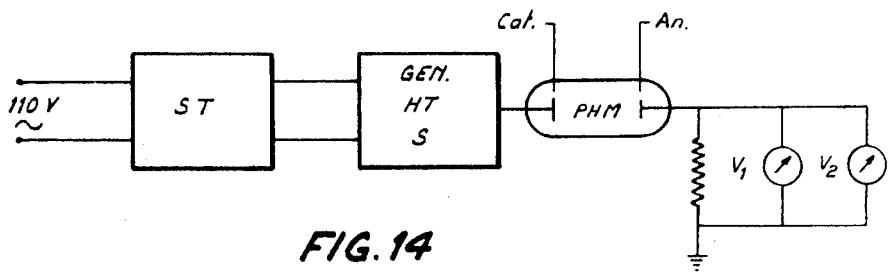

FIG. 14 represents schematically a portion of the electrical circuit associated with the apparatus of FIG. 13.

Figure 15:
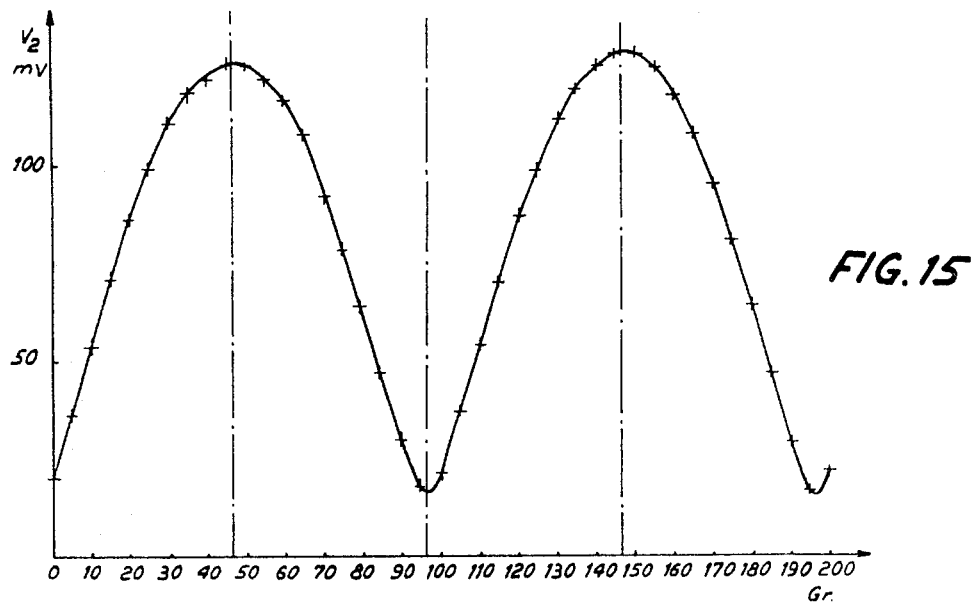

FIG. 15 represents the variation of the alternating voltage in the output of the electron photomultiplier as a function of the angular position of the polarizer.

Figure 15A:
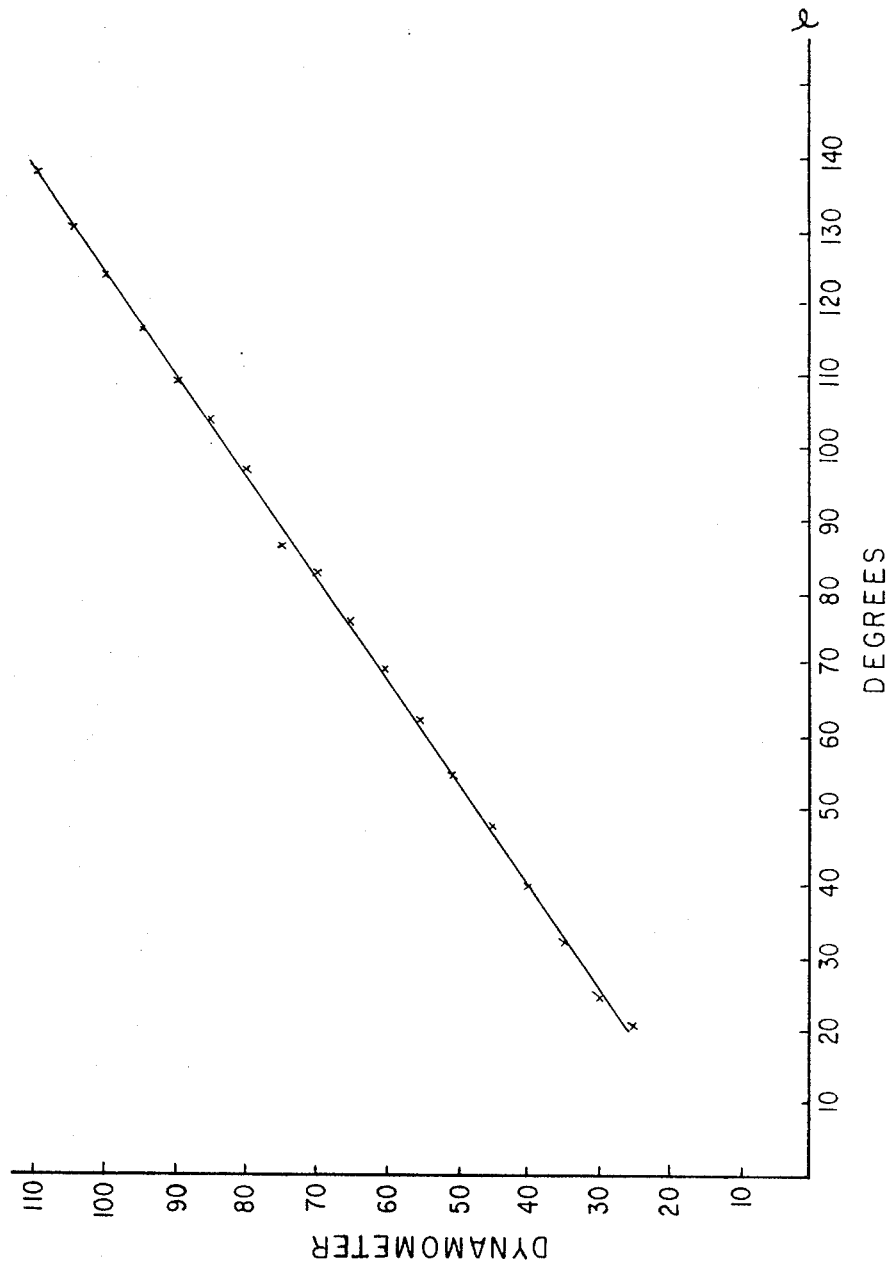

FIG. 15a represents the variation in the phase angle $\Phi$ for the model as a function of the mechanical load placed on the model.

Figure 16:
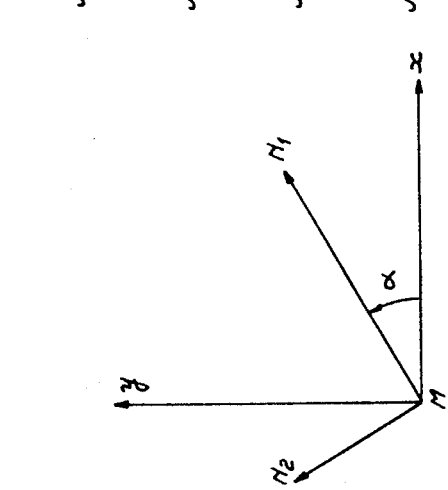

FIG. 16 represents two stresses $N_1$ and $N_2$ with respect to rectangular axes.

Figure 17:
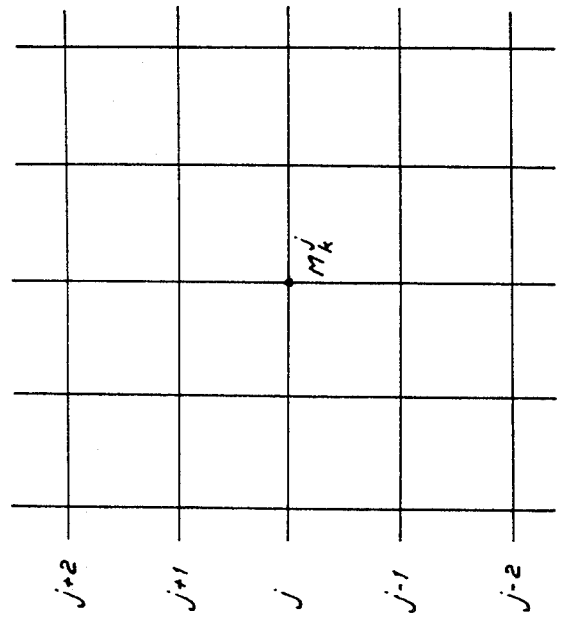

FIG. 17 represents a square diagram for studying stresses at point $M_k{}^j$. .

Figure 18:
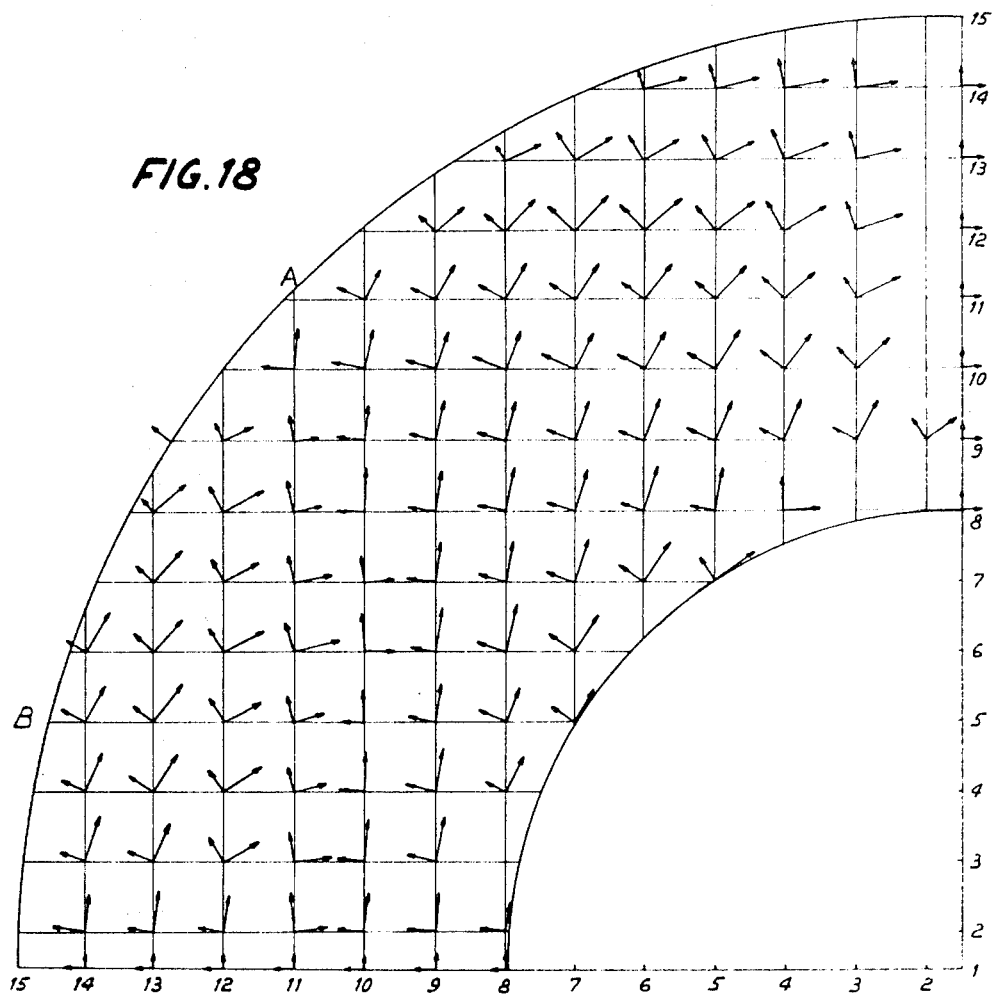

FIG. 18 represents experimental results achieved by means of a thick annulus made of methyl Polymethacrylate submitted to tensile force.

Figure 19:
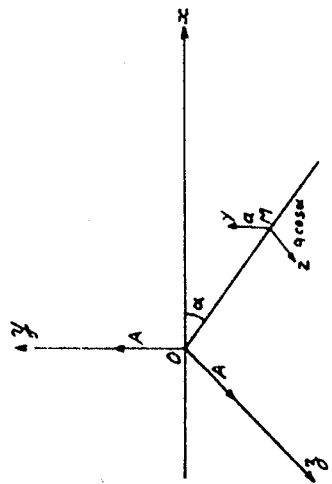

FIG. 19 represents in a Cartesian system of coordinates a vibration, such as a light vibration.

Figure 20:
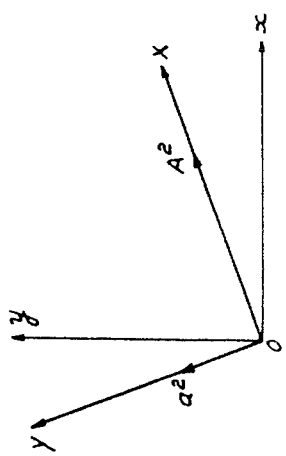

FIG. 20 represents the case of a partly polarized light vibration.

Figure 21:
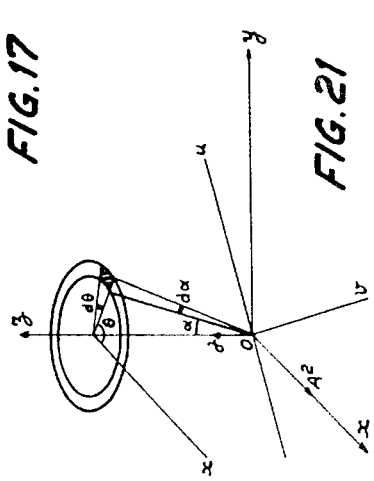

FIG. 21 represents a diagram used for describing the invention.

Figure 22:
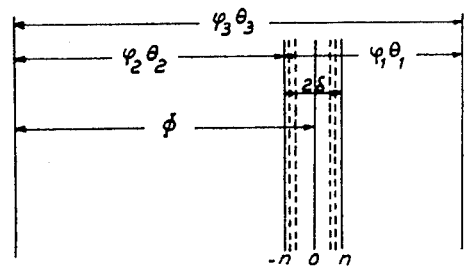

FIG. 22 represents schematically a series of variables used in describing the present invention.

Figure 23:
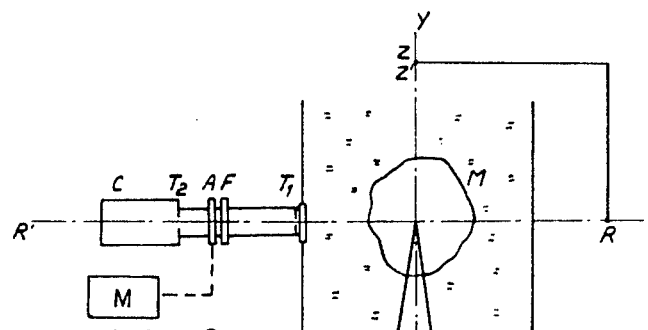

FIG. 23 represents schematically an embodiment of the present invention, which has been used to measure the stress in a model measuring 30×30×120 mm. subjected to a compression force.

Figure 25:
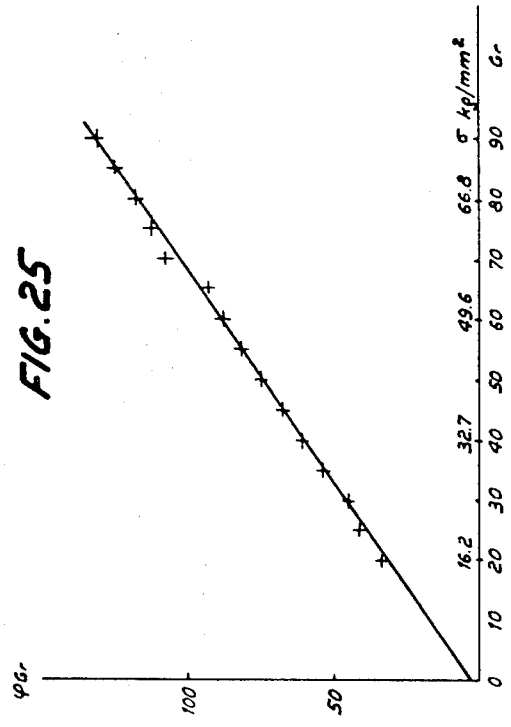
Figure 24:
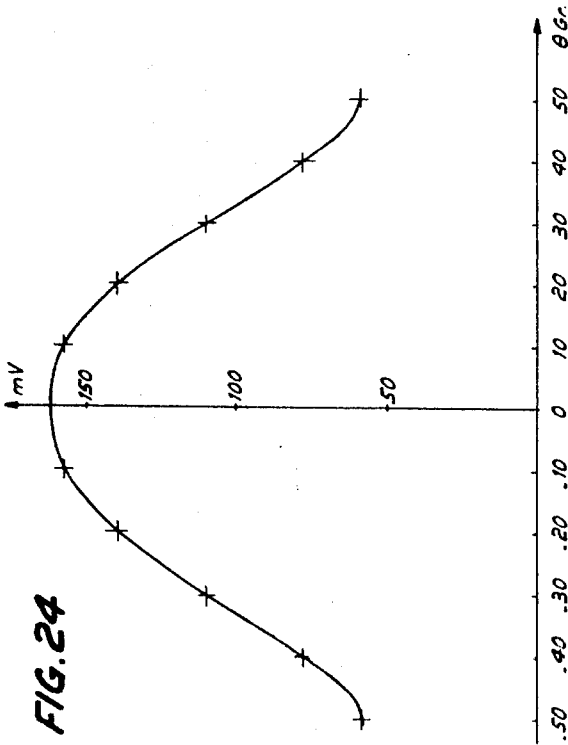

FIGS. 24 and 25 represent, in a system of rectangular coordinates, results obtained experimentally.

Figure 26:
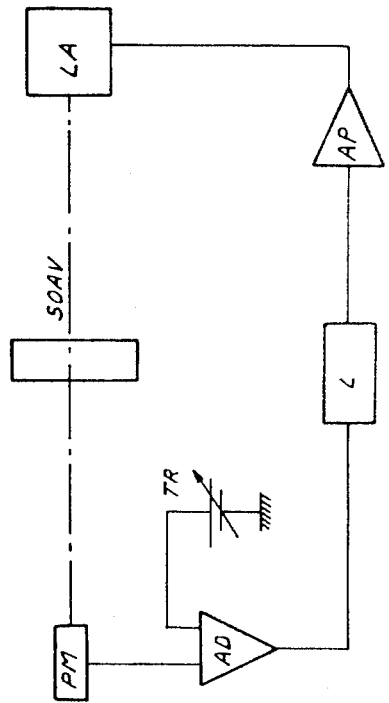

FIG. 26 represents schematically a device for controlling the DC voltage of the electron photomultiplier tube, so as to keep it constant.

FIG. 27 represents in perspective a commercial embodiment of the apparatus in accordance with features of the present invention.

The present invention may advantageously be used to measure the stresses present in a transparent model by the use of scattered light. Measurements are carried out before and after making a relative displacement between a specific point of the model and the impinging beam of light. From the variation of the state of polarization from one case to the other, it is possible to calculate, for the small volume of matter laying between the corresponding zones for the two impinging beams, the directions of the main stresses (these are considered generally the main secondary stresses) in the plane of the wave of the scattered beam, as well as the differences between the values of these main stresses. Three operations of this type, within three distinct planes intersecting one another at the point considered, are sufficient in every case for computing, at this point, the directions of the main stresses and their differences, taken two at a time.

The state of polarization may be easily determined by electronically measuring the energy transmitted through a rapidly rotating analyzer which is traversed by the light beam leaving the body perpendicularly to the impinging beam. The electronic measuring device can also be used to determine the state of polarization in the case of a plane model.

The invention will be well understood by means of the following additional description in which the theoretical basis of the invention is first stated and then embodiments of the invention are described.

Introduction

It is known that a substance traversed by a light beam scatters the light in every direction and that when the direction of observation is perpendicular to the impinging beam, the received scattered light is totally polarized. The direction of polarization is perpendicular to the plane defined by the impinging beam and by the direction of observation.

This well-known scattered-light phenomenon has been applied to simple cases by using an analyzer. An object of the present invention is to provide methods and apparatus for utilizing this light-scattering phenomenon as a polarizer and, through this new technique for determining the direction of the main secondary stresses and of the phase angle at one point in a thin plate envisaged within the body to be studied. Thus, by by three measurements of the axes and of the phase angle of such thin plates intersecting along three mutually perpendicular axes at the point of interest in the model, one is able to find the direction of the main stresses, and their differences, at that point. The methods and apparatus of this invention are therefore much more general than the prior art discussed above which is limited by the fact that measurements can only be made in planes of symmetry of the model.

The use of this new technique necessitates, however, a study of the state of polarization of the outgoing light beam after it has traversed a certain thickness of the model wherein the direction of the stresses does not maintain the same orientation.

Hereinafter, there will be described a new process for determining the axes and the phase angle of a birefringent medium, which may be followed with another active medium possessing a rotatory power. The application of this process to a plane model which has been subjected to stress confirms the validity and the precision of the process for measuring stresses in accordance with the present invention.

Theoretical Basis

The theory of the present invention is based on the work of Henri Poincare as published in "Theorie Mathematique de la Lumiere" Gauthier-Villars, Editor, Paris (1889). This publication contains a very full geometrical representation of a luminous vibration. Let us consider a rectilinear vibration V impinging upon a birefringent plate, the axes of which are O$x$ and O$y$, as shown in FIG. 1. Let $V=V_o \cos\omega t$, where $V_o$ is the amplitude of the vibration and $\omega t$ is the frequency of the vibration. At the point of impingement on the plate, the light vibration may be resolved into two vibrations directed along the two perpendicular axes of the plate, let the components of the vibration along the OX axes be represented by X and the component of the vibration along the OY axis be represented by Y wherein:

$$X = A_0 \cos \omega t$$
$$Y = B_0 \cos \omega t$$

with:

$$A_0 = V_0 \cos \alpha$$
$$B_0 = V_0 \sin \alpha$$

wherein $\alpha$ is the angle between the impinging vibration and one axis of the plate. These two vibrations are propagated in the plate with different speeds and, at their emergence from the plate, these vibrations may be represented by:

$$\xi = A_0 \cos(\omega t + \varphi)$$
$$\eta = B_0 \cos(\omega t + \psi)$$

where $\xi$ and $\eta$ are respectively the emerging vibrations in the OX and OY direction; and $\varphi$ and $\psi$ are respectively the phase retardations in the OX and OY directions.

According to Poincare's notation, these components of the vibration emerging from the blade are the real parts of the expressions:

$$\xi = Ae^{i\omega t}$$
$$\eta = Be^{i\omega t}$$

with:

$$A = A_0 \beta^{i\varphi}$$
$$B = B_0 \beta^{i\psi}$$

The ratio $B/A$ is generally an imaginary quantity which may be written in the form:

$$\frac{B}{A} = u + iv$$

This ratio gives the shape and the orientation of the ellipse resulting from combining the two vibrations directed along the axes of the plate. Poincare represents the variations of this ellipse by the displacement of the imaginary magnitude $U+iv$, that is to say the point having $u$ for abscissa and $v$ for ordinate, as shown in FIG. 2.

If the ratio $B/A$ is a real quantity as opposed to an imaginary quantity, the representative point Q is on the $u$ axis and the ratio $\eta/\xi$ is a real quantity. Therefore, the vibration is rectilinear and the angle of its direction with the axis O$x$ is such that:

$B/A = \tan \Theta$ and $u=OQ$. O$If the ratio B/A$ is a purely imaginary quantity, the representative point N is on the $v$ axis. The components represent a phase difference of $\pi/2$. The vibration is represented by an ellipse whose axes are directed along $x$ and O$y$, and are in the ratio of $B/A = ON$.

The points located above $ou$ represent right-handed vibrations and the points located below O$u$ represent left-handed vibrations.

Let us consider a vibration represented by point M and let us suppose that this vibration traverses a plate whose main cross sections are directed along the coordinate axes. The ratio $B/A$ changes and becomes $B/A\, e^{i\Phi}$. The point M' representing the new vibration will be such that $OM'=OM$ and $<MOM' = \Phi$. Everything takes place as if the plane had rotated through an angle $\Phi$ about O.

The locus of the points representing vibrations whose axes present the same orientation $\Theta$ or the same ratio of flattening $\tau$ will now be determined. For this purpose, there is considered the quantity:

$$w = u + iv$$

with:

$$w = \frac{a+bt}{c+dt}$$

$a$, $b$, $c$ and $d$ being imaginary constants and $t$ a real variable. The theorem thus obtained, which will not be derived in this specification, is the following: "When $t$ varies from minus infinity to plus infinity, the point having for coordinates $u$ and $v$ moves along a circle."

Let us assume $\Theta$ = constant, that is to say that the axes of the ellipse are fixedly oriented. When $\tau$ varies from minus infinity to plus infinity, the representative point describes a circle intercepting the points P and P' having the coordinates 0, 1 and minus 0,1 respectively (as shown in FIG. 3).

If we now assume $\tau$ = constant, when tan $\Theta$ varies from minus infinity to plus infinity, the representative point describes a circle centered on the $v$ axis and orthogonal to the precedent circle. If there are two ellipses $N$ and $N'$ having a flattening ratio of $\tau$ and of $1/\tau$ we obtain:

$$1 = ON \cdot ON' = OP^2 = OP'^2.$$

Therefore, if a vibration is represented by a point M (see FIG. 3), its orientation is obtained by drawing the circle passing through P, P' and M and by taking tan $\Theta = OQ$. The flattening of the ellipse is obtained by drawing a circle which passes through M and is orthogonal to the preceding circle and by taking $\tau = ON$.

To simplify the discussion, Poincare supplemented this representation with another on a sphere which is obtained by stereograpic projection of the plane $u$, $v$, the point O being the contact point of the plane and of the sphere, as shown in FIG. 4. It will be recalled that the so-called sterographic projection preserves the angles.

At point M on the plane, a corresponding point $m$ located where the straight line VM intersects the sphere. It is this point $m$ which is taken as a point representing the vibration.

The $u$ axis is projected according to a great circle of the sphere passing through point O or equator. The points of the equator represent, therefore, rectilinear vibrations.

Further, $OQ = \tan \Theta$. Therefore, the sphere has a diameter equal to 1:

$$\Theta = <OVq$$

$$2\Theta = <OCq$$

The angle $\Theta$ of the axes of the ellipse with respect to the coordinate axes is equal to half the longitude of point $q$.

Two points $q$ and $q'$ opposed diametrically represent rectilinear vibrations of rectangular directions.

The points of the $v$ axes are projected on a great circle perpendicular to the equator which will be called hereinafter the first meridian.

$$<OCN = 1 = \text{latitude}$$

$$<OVN = 1/2$$

$$\tau = ON = \tan 1/2$$

The points P and P' correspond to circular vibrations being projected to the poles $p$ and $p'$ of the first meridian.

The orientation $\Theta$ of the axes depends only upon the longitude. The loci of points such that $\Theta$ = constant are the meridians passing through $p$ and $p'$.

The flattening $\tau$ depends only upon the latitude and the locus of the points such that $\tau$ = constant are parallel lines.

Let us suppose now that the light beam traverses a birefringent plate having no rotary power and introducing a phase shift $\Phi$. One of the axes of the plate corresponds, for instance, to point $q$ and the other to point $q'$.

The vibration at the output of the plate will be computed from the vibration at the input by a rotation of the representative point through an angle $\Phi$ about the axis $qq'$ which is an axis located in the plane of the equator.

If the light beam traverses a plate possessing a rotary power $R$, but having no birefringent effect, the ellipse changes its orientation but preserves its shape. Everything takes place as if the sphere was rotated through an angle $2R$ about $pp'$.

Let us consider now the action of a series of birefringent plates upon a vibration. When a light beam traverses a series of birefringent plates whose axes are separated by a phase angle but which do not possess any light-rotating power, it is possible to demonstrate the following theorem: "A series of birefringent plates is equivalent to a single birefringent plate followed by a medium having a light-rotating power."

Let us consider the case where two birefringent plates are positioned Seriatim, in the path of a light beam. In this case, it is possible to demonstrate the following theorem: "Two birefringent plates are equivalent to a single birefringent plate followed by a medium having a light-rotating power."

Let us associate with the sphere shown in FIG. 4 a trihedron $Cxyz$, the axis $Cz$ being superimposed on the line $pp'$, the plane $xy$ being the plane of the equator, as shown in FIG. 5. A birefringent plate corresponds, therefore, to a rotation about an axis located in the plane $xy$ and to a light-rotating power corresponding to a rotation about $Cz$. It is important to note that these rotation axes are fixed in space and not tied to the sphere.

It is now necessary to pass over the sphere from a point $m$ representing the vibration at the input, to a point $m_2$ representing the vibration obtained after traversing the two birefringent elements introducing phase angles $\Phi_1$ and $\Phi_2$. Point $m_2$ is therefore derived from point $m$ by two successive rotations through angles $\Phi_1$ and $\Phi_2$ about the two axes $q_1$ and $q_2$ in plane $xy$. The $x$ axis may be taken as that of axis $q_1$, as shown in FIG. 5. Poincare has demonstrated that these two rotations are equivalent to a single rotation of an angle $2R$ about the axis $Cz$ followed by a rotation of an angle $\Phi$ about the axis $q$ in the plane $xy$, which makes an angle $2u$ with $Cx$. Simple considerations on trihedrons demonstrate that one can pass also from point $m$ to point $m_2$ by a rotation of an angle $\Phi$ about the axis $q_3$ in plane $xy$ which makes an angle of $2(u-R)$ with axis $Cx$ followed by a rotation $2R$ about $Cz$.

Thus, there is demonstrated the following theorem: "Two birefringent plates having phase shifts of $\Phi_1$ and $\Phi_2$ respectively are equivalent to a single birefringent plate having a phase shift of $\Phi$ followed by a medium having a light-rotating power of $2R$."

From this conclusion, we can deduce that it is always possible to pass from a point $m$ on a sphere to another point $m_2$ on the sphere by two successive rotations; one about an axis located in the plane of the equator and the other about the axis $pp'$.

Let us consider therefore a light vibration which traverses a series of birefringent plates. At the input, the vibration is represented by a point $m_1$. At the output, the vibration is represented by a point $m_2$.

As shown hereinbefore, a series of birefringent plates is equivalent to a single birefringent plate followed by a medium having a light-rotating power.

Let us apply the above teaching to scattered light from an impinging nonpolarized light beam.

For this purpose, let us consider FIG. 6.

An impinging nonpolarized light beam SM is observed in a perpendicular direction, i.e. MO. In M, the light scattered along MO is polarized in the direction P perpendicular to plane SMO.

At N, the output of the model, the light vibration has become elliptical and from M to N, the model may be likened to a series of birefringent plates. These blades are equivalent to a single birefringent plate $\Phi_2$ whose axes make an angle $\Theta_2$ with a reference direction, followed by a rotatory power $R_2$. It will be seen later how $\Phi_2$, $\Theta_2$ and $R_2$ are determined experimentally.

Let us move the impinging beam from SM to S'M'. The effect would be the same as having, in front of the entire assembly, an unknown birefringent plate $\Phi_1$ whose axes make an unknown angle $\Theta_1$ with the reference direction. From M' to N, the assembly is equivalent to a birefringent plate $\Phi_3$ whose axes make an angle $\Theta_3$ with the reference direction followed by a rotational power $R_3$.

There will now be established the relations existing between $\Theta_1, \Phi_1, \Theta_2, \Phi_2, R_2, \Theta_3, \Phi_3$ and $R$, and from this the unknown quantity $\Theta_1$ and $\Phi_1$ will be derived.

With respect to the light-rotating powers, only the difference $R=R_3-R_2$ must be taken into account. Since the reference direction can be arbitrarily chosen, it is possible to choose the reference direction such that $\Theta_2=0$. We will, therefore, choose as the reference the axis of the first birefringent plate measured as shown in FIG. 7.

The following equations may be written:

Rotation $\Phi_1$ about axis $q_1$ inclined at an angle $2\Theta_1$ with respect to axis $ox$, $x$ rotation $\Phi_2$ about axis $Ox$ = rotation $\Phi_3$ about axis $q_3$ inclined of an angle $2\Theta_3$ with respect to axis $Ox$, $x$ rotation $2R$ about axis $Oz$.

The transformation matrix representing the rotation $\Phi_1$ and $\Phi_2$ is as follows:

$$A = \begin{bmatrix} 1 & 0 & 0 \\ 0 & \cos\varphi_2 & -\sin\varphi_2 \\ 0 & \sin\varphi_2 & \cos\varphi_2 \end{bmatrix} \begin{bmatrix} \cos 2\theta_1 & -\sin 2\theta_1 & 0 \\ \sin 2\theta_1 & \cos 2\theta_1 & 0 \\ 0 & 0 & 1 \end{bmatrix}$$

$$\begin{bmatrix} 1 & 0 & 0 \\ 0 & \cos\varphi_1 & -\sin\varphi_1 \\ 0 & \sin\varphi_1 & \cos\varphi_1 \end{bmatrix} \begin{bmatrix} \cos 2\theta_1 & \sin 2\theta_1 & 0 \\ -\sin 2\theta_1 & \cos 2\theta_1 & 0 \\ 0 & 0 & 1 \end{bmatrix}$$

The transformation matrix representing the rotation $\Phi_3$ and $2R$ is as follows:

$$B = \begin{bmatrix} \cos 2R & -\sin 2R & 0 \\ \sin 2R & \cos 2R & 0 \\ 0 & 0 & 1 \end{bmatrix} \begin{bmatrix} \cos 2\theta_3 & -\sin 2\theta_3 & 0 \\ \sin 2\theta_3 & \cos 2\theta_3 & 0 \\ 0 & 0 & 1 \end{bmatrix}$$

$$\begin{bmatrix} 1 & 0 & 0 \\ 0 & \cos\varphi_3 & -\sin\varphi_3 \\ 0 & \sin\varphi_3 & \cos\varphi_3 \end{bmatrix} \begin{bmatrix} \cos 2\theta_3 & \sin 2\theta_3 & 0 \\ -\sin 2\theta_3 & \cos 2\theta_3 & 0 \\ 0 & 0 & 1 \end{bmatrix}$$

It is, of course, necessary that $A = B$.

Thus, when the products are made, it is found that:

$A = [a_{ij}]$ $a_{11} = 1 - \sin^2 2\theta_1(1-\cos\varphi_1)$
$a_{12} = \sin 2\theta_1 \cos 2\theta_1(1-\cos\varphi_1)$
$a_{13} = \sin 2\theta_1 \sin\varphi_1$ $a_{21} = \sin 2\theta_1 \cos 2\theta_1(1-\cos\varphi_1)\cos\varphi_2 + \sin 2\theta_1 \sin\varphi_1 \sin\varphi_2$
$a_{22} = [1-\cos^2 2\theta_1(1-\cos\varphi_1)]\cos\varphi_2 - \cos 2\theta_1 \sin\varphi_1 \sin\varphi_2$
$a_{23} = -\cos 2\theta_1 \sin\varphi_1 \cos\varphi_2 - \cos\varphi_1 \sin\varphi_2$ $a_{31} = \sin 2\theta_1 \cos 2\theta_1(1-\cos\varphi_1)\sin\varphi_2 - \sin 2\theta_1 \sin\varphi_1 \cos\varphi_2$
$a_{32} = [1-\cos^2 2\theta_1(1-\cos\varphi_1)]\sin\varphi_2 + \cos 2\theta_1 \sin\varphi_1 \cos\varphi_2$
$a_{33} = -\cos 2\theta_1 \sin\varphi_1 \sin\varphi_2 + \cos\varphi_1 \cos\varphi_2$ $B = [b_{ij}]$ $b_{11} = \cos 2R [1-\sin^2 2\theta_3(1-\cos\varphi_3)] - \sin 2R \sin 2\theta_3 \cos 2\theta_3(1-\cos\varphi_3)$
$b_{12} = \cos 2R \sin 2\theta_3 \cos 2\theta_3(1-\cos\varphi_3) - \sin 2R [1-\cos^2 2\theta_3(1-\cos\varphi_3)]$
$b_{13} = \cos 2R \sin 2\theta_3 \sin\varphi_3 - \sin 2R \cos 2\theta_3 \sin\varphi_3$ $b_{21} = \sin 2R [1-\sin^2 2\theta_3(1-\cos\varphi_3)] + \cos 2R \sin 2\theta_3 \cos 2\theta_3(1-\cos\varphi_3)$
$b_{22} = \sin 2R \sin 2\theta_3 \cos 2\theta_3(1-\cos\varphi_3) + \cos 2R [1-\cos^2 2\theta_3(1-\cos\varphi_3)]$
$b_{23} = \sin 2R \sin 2\theta_3 \sin\varphi_3 - \cos 2R \cos 2\theta_3 \sin\varphi_3$ $b_{31} = -\sin 2\theta_3 \sin\varphi_3$
$b_{32} = \cos 2\theta_3 \sin\varphi_3$
$b_{33} = \cos\varphi_3$.

From the equalities:

$$a_{13} = b_{13} \quad a_{23} = b_{23} \quad a_{33} = b_{33}$$

$\Theta_1$ and $\Phi_1$ are derived without intervention of the light rotating power. In effect, the following expressions are obtained:

$$tg 2\theta_1 = \frac{-\sin 2\theta_3 \sin\varphi_3}{\sin\varphi_2 - \cos 2\theta_3 \sin\varphi_3}$$

$$\cos\varphi_1 = \frac{\sin\varphi_2 \sin\varphi_3 \cos 2(\theta_3-\theta_1)\cos 2\theta_1 + \cos\varphi_2 \cos\varphi_3}{\sin^2\varphi_2 \cos^2 2\theta_1 + \cos^2\varphi_2}$$

(1)

It appears therefore that it is sufficient to measure $\Phi_2$, $\Theta_2$, $\Phi_3$ and $\Theta_3$ to determine $\Phi_1$ and $\Theta_1$.

Determination of the Axes and of the Phase Angles

From the above theoretical considerations, it appears, that there are two aspects of the problem to be solved. That is, it is both necessary to determine the axes of the birefringent plate and the phase difference it produces.

Let us consider a luminous vibration having a half axis $a$ and $b$ (see FIG. 8). It is always possible to consider such a vibration as consisting of two rectilinear vibrations directed along the axes $0x$ and $oy$ of an ellipse having amplitudes of $a$ and $b$ and a phase angle of $\pi/2$, let:

$$x = a\cos\omega t$$

$$y = b\cos\left(\omega t - \frac{\pi}{2}\right)$$

Let us determine the light intensity transmitted by an analyzer inclined at an angle $\alpha$ with respect to the axes OX.

The analyzer transmits a vibration which is the summation of the components of the vibrations in the $x$ and $y$ directions. Let:

$$a\cos\alpha \cos\omega t + b\sin\alpha \cos\left(\omega t - \frac{\pi}{2}\right).$$

The intensity or energy transmitted by the analyzer is equal to the square of the amplitude of this vibration. Thus:

$$E = a^2 \cos^2\alpha + b^2 \sin^2\alpha$$

or $$E = \frac{a^2+b^2}{2} + \frac{a^2-b^2}{2}\cos 2\alpha$$

By introducing a coefficient of flattening $\tau$ of the ellipse defined as $\tau = b/a$, we obtain:

$$E = \frac{a^2+b^2}{2}\left[1 + \frac{1-\tau^2}{1+\tau^2}\cos 2\alpha\right]$$

Note that when a birefringent plate receives a rectilinear vibration of constant amplitude but of variable orientation, the flattening $\tau$ of the ellipse at the output of the plate changes, but the quantity $a^2+b^2$ remains constant.

Measure of the energy

Consider the situation where the light energy $E$, given by the above equation, is received by an electron photomultiplier and transformed into an electrical current. The potential difference set up by this current may be measured at the terminals of a resistance.

Let the analyzer rotate rapidly, the voltage in the output of the electron photomultiplier will be:

$$V = \frac{a^2+b^2}{2}\left[1 + \frac{1-\tau^2}{1+\tau^2}\cos 2\alpha\right]$$

resulting from the superposition of a constant voltage:

$$V_1 = \frac{a^2+b^2}{2}$$

and a sinusoidal voltage:

$$V_2 = \left(\frac{a^2+b^2}{2}\right)\left(\frac{1-\tau^2}{1+\tau^2}\cos 2\alpha\right)$$

If a DC voltmeter and an AC voltmeter are connected in parallel at the output of said electron photomultiplier, the first will indicate the constant output voltage component and the second the r.m.s. value of the alternating component of the output voltage, which is proportional to the flattening coefficient $\tau$ of the ellipse.

Determination of the Axes

Let us consider now, by reference to Poincare's plane representation, a birefringent plate having the axes $Ox$ and $Oy$ (see FIG. 9) and introducing a phase shift $\Phi$. Let us suppose that this plate receives a rectilinear light vibration the orientation of which is varied with respect to the said axes.

Let us look for the positions of the polarizer such that for the impinging rectilinear vibration, the output from the plate will comprise elliptical vibrations having the same coefficient of flattening.

The elliptical vibrations are represented by points $MM'M_1M'_1$ (see FIG. 9) which are the points of intersection of the two circles corresponding to the same flattening with the straight lines $y/x = \tan \Phi$. The impinging rectilinean vibrations are, therefore, represented by points $QQ'Q_1Q'_1$:

It is immediately noted that:

$$\overline{OQ}\ \overline{OQ'} = \overline{OM}\ \overline{OM'} = \overline{OP^2} = 1$$

that is to say:

$$\tan \Theta \times \tan \Theta' = 1 .$$

The vibrations Q and Q' are therefore symmetrical with respect to a direction at 45° from the axes of the birefringent plate.

It is also noted that:

$$\overline{OQ} = -\overline{OQ_1}$$
$$\overline{OQ'} = -\overline{OQ_1'}$$

that is:

$$\tan \Theta = -\tan \Theta_1$$
$$\tan \Theta' = -\tan \Theta'_1.$$

The vibrations Q and $Q_1$, Q' and $Q'_1$ are therefore symmetrical with respect to the axes of the birefringent plate.

Summing up, then, two rectilinear vibrations giving rise to elliptical vibrations having the same flattening coefficient are symmetrical with respect to the axes of a birefringent plate or with respect to a direction at 45° from these axes.

The method for determining the axes of a birefringent plate comprises, therefore, to looking for two orientations of the polarizer which give, in the output, two ellipses having the same coefficient of flattening.

The result is obtained by means of a slow rotation of the polarizer during which rotation a search is made for two positions for which the r.m.s. value of the output voltage is the same.

In the case of a model studied with scattered light, the model itself comprises the polarizer and will be rotated about the point of interest. This will, of course, cause a rotation of the direction of the axes, with respect to the fixed direction of polarization.

It is particularly important to note that it is thus possible to find directly the axes of the birefringent plate placed in front of a medium having a light-rotating power.

Determination of the Phase Angle of the Birefringent Body

Let $\Theta$ be the angle of the incident vibration $V$ with respect to the axes $Ox$ and $o$ of a birefringent plate introducing a phase shift $\Phi$ (see FIG. 10).

With respect to axes $Ox$ and $Oy$, the equation of the ellipse at the output of the birefringent plate is:

$$\frac{x^2}{\cos^2 \theta} - \frac{2xy}{\cos \theta \sin \theta} \cos \rho + \frac{y^2}{\sin^2 \theta} = \sin^2 \rho$$

The coefficient of flattening $\tau$ is linked to the angle $\Theta$ and to the phase angle $\Phi$ by the equation:

$$\frac{1-\tau^2}{1+\tau^2} = \sqrt{1 - \sin^2 2\theta \sin^2 \rho}$$

The r.m.s. value of the voltage:

$$V = \left(\frac{a^2+b^2}{2\sqrt{2}}\right)\left(\frac{1-\tau^2}{1+\tau^2}\right)$$

read on an AC voltmeter is therefore proportional to:

$\sqrt{1-\sin^2 2\Theta \sin^2 \Phi}$. Let us study as a function of the angle $\Theta$ the curve:

$$y = \sqrt{1-\sin^2 a 20 \sin^2 \Phi}$$

which gives the variation of the quantity $$\frac{1-\tau^2}{1+\tau^2}$$

The table of the variation of $y$ as a function of $\Phi$ is given below:

TABLE I

| | 0 | 0 | $\frac{\pi}{4}$ |
|---|---|---|---|
| | $y'$ | 0 | $-\left(\sin \rho \neq \frac{\pi}{2}\right)$ |
| | $y$ | 1 | ↘ $|\cos \rho|$ |
| Radius of curvature R | | $\frac{-1}{4 \sin^2 \rho}$ | $\frac{|\cos \rho|}{4 \sin^2 \rho}$ |

The shape of the curve of variation is given in FIG. 11.

Whatever the phase angle $\Phi$ may be, the radius of curvature of the curve is always smaller at the minimum ($\Theta=\pi/4$) than at the maximum ($\Theta=0$).

In the case in which $\Phi=\pi/2$, there is obtained:

$$y = |\cos 2\theta|$$

and the representative curve is that of FIG. 12.

From table I and from the curves of FIGS. 11 and 12, one may compute:

$$|\cos \rho| = \frac{y_{mini}}{y_{maxi}} = \frac{y_0 - \frac{\pi}{4}}{y_{0-0}}$$

The principle of the measuring process is therefore as follows:

After determining the axes according to the method previously described, the direction of the impinging vibration is placed successively at an angle of 45° on these axes and to coincide with one of these axes. The ratio of the two r.m.s. voltages $V$ gives the absolute value of the cosine of the phase angle, the DC voltage having been maintained constant.

Application of the Process to the Study and Measurements of Mechanical Stresses in a Plane Model Before demonstrating the use of the method in three-dimensional photoelasticity measurements by means of scattered light, the method will first be applied to the study of a plane model consisting of a sheet of methyl polymethacrylate which is subjected to a tensile force.

The diagram of the apparatus used is shown in FIG. 13 in which:

S is a light source
F is a monochromatic filter
$L_1$ is a condensing lens
D is a diaphragm $L_2$ is a lens
P is a polarizer
M is a model to be studied
A is a rotating analyzer
C is an electron photomultiplier.

The analyzer is set into rotation by means of a rotating motor which rotates at a speed of about 2,800 r.p.m.

To avoid a parasitic stroboscopic effect, the light source is fed with a direct current by means of a rheostat. This ensures that the light flux remains constant.

The electron photomultiplier used is an electron tube RCA 5819 fed by a voltage of 1,000 volts. The readings were made between the anode and ground through a resistance.

The diagram of the electrical circuit employed is shown in FIG. 14.

The model to be studied was subjected to a tensile load.

The polarizer was rotated by increments of 5° from 0° to 200°. The position 0 being any position with respect to the axes of the model. For each position of the polarizer, the reading of the AC voltmeter $V_2$ was noted. The value of $V_1$, the reading on the DC voltmeter, was maintained constant by means of a rheostat. The results of these measurements are listed below in Table II and are also shown in FIG. 15.

On FIG. 15, it will be seen that the curve is perfectly symmetrical with respect to inclinations, relative to the 0 position of the polarizer, of 46.5°, 96.4° and 146.6°. The axes of the birefringent models are thus inclined with respect to the 0 position of the polarizer by an angle of 46.5° at about 0.1°.

In FIG. 14, there has been shown the electrical circuit of the electron photomultiplier C of FIG. 13. As will be seen, the cathode of the electron photomultiplier is connected to a regulated high-voltage source HTS fed, for example, from the electrical mains through a voltage regulator ST. At the output of the electron photomultiplier a resistance R is connected to ground in parallel with $V_1$ and $V_2$; FIG. 15 illustrates the way in which the r.m.s. value of the alternating voltage varies with the rotation of the polarizer.

TABLE II

| Position of the polarizer (degrees) | V (mV) | Position of the polarizer (degrees) | V (mV) |
|---|---|---|---|
| 0 | 20 | 100 | 21 |
| 5 | 36 | 105 | 36.5 |
| 10 | 54 | 110 | 54 |
| 15 | 71 | 115 | 70.5 |
| 20 | 86.5 | 120 | 87 |
| 25 | 99.5 | 125 | 99 |
| 30 | 111 | 130 | 111.5 |
| 35 | 119 | 135 | 119.5 |
| 40 | 122 | 140 | 125.5 |
| 45 | 126 | 145 | 128 |
| 50 | 126 | 150 | 128.5 |
| 55 | 122.5 | 155 | 125 |
| 60 | 117 | 160 | 118 |
| 65 | 108 | 165 | 108.5 |
| 70 | 92.5 | 170 | 95.5 |
| 75 | 78.5 | 175 | 81 |
| 80 | 64 | 180 | 64.5 |
| 85 | 47 | 185 | 47 |
| 90 | 30 | 190 | 29 |
| 95 | 17.5 | 195 | 17 |
|  |  | 200 | 22 |

Since this curve is perfectly symmetrical, it is not necessary to trace the entire curve to find the axes. It is sufficient to choose the r.m.s. value of the output voltage located in the zone of maximum sensitivity and to look for the position of the polarizer which gives the same value for the r.m.s. voltage.

In the interval from 0° to 200° for an AC voltage taken equal to 75mV., we find angles of 15.2°, 77.2°, 115.9° and 177.2°. By taking the average of these values two by two, we obtain for the axes of the birefringent plate and for the bisector line thereof, the value 46.2°, 96.2° and 146.55°. It is noted that the position of the axes is determined very rapidly with a precision of about 0.2°.

It will also be noted that these measurements were made with a polarizer whose graduation scale did not comprise a sliding-gauge. Each reading, therefore, could only be taken to an accuracy of about 0.2°.

The method, therefore, obtains the position of the axes of a birefringent plate with an error of at most 0.1°. This precision is far better than that which can be obtained by the prior art method using isocline lines.

The phase angle has also been measured, by the method indicated above, for incremental loads. The results of these measurements are given in Table III below and in FIG. 15a.

It will be seen from this figure that the points are almost perfectly placed on a straight line with deviation of less than 1°, corresponding to about 1/400 of fringe interference of light. This error may in part result from

TABLE III

| Graduation of the dynamometer | $\varphi$, kg./mm.² | Measure for $\theta=0$ (mV) | Measure for $\theta=\frac{\pi}{4}$ (mV) | $|\cos \varphi|$ | $\varphi$, degrees |
|---|---|---|---|---|---|
| 25 | 0.049 | 96.5 | 91 | 0.9430 | 19°26' |
| 30 | 0.070 | 96.5 | 86.95 | 0.9010 | 25°42' |
| 35 | 0.092 | 96.5 | 81 | 0.8394 | 32°55' |
| 40 | 0.113 | 96.5 | 73.25 | 0.7591 | 40°37' |
| 45 | 0.135 | 96.5 | 65.1 | 0.6746 | 47°35' |
| 50 | 0.156 | 96.5 | 56 | 0.5803 | 54°32' |
| 55 | 0.177 | 96.5 | 44.75 | 0.4637 | 62°22' |
| 60 | 0.199 | 96.5 | 34 | 0.3523 | 69°22' |
| 65 | 0.220 | 96.5 | 23.6 | 0.2446 | 75°51' |
| 70 | 0.242 | 96.5 | 12.3 | 0.1275 | 82°41' |
| 75 | 0.262 | 96.5 | 6.85 | 0.0710 | 85°56' |
| 80 | 0.284 | 96.5 | 12 | 0.1243 | 97°09' |
| 84.9 | 0.305 | 96.5 | 22.2 | 0.2300 | 103°18' |
| 89.9 | 0.326 | 96.5 | 32.5 | 0.3368 | 109°41' |
| 95 | 0.348 | 96.5 | 44 | 0.4560 | 117°08' |
| 100 | 0.370 | 96.5 | 54 | 0.5596 | 124°02' |
| 105 | 0.391 | 96.5 | 64 | 0.6632 | 131°33' |
| 110 | 0.412 | 96.5 | 72 | 0.7461 | 138°15' | the system which was used to apply the load to the model.

One may also note that the well known Tardy method, currently used in photoelasticity, does not permit the measurement of the phase angle to an accuracy of much more than 1/100 of a fringe.

In the representative curve of FIG. 15a it will be noticed that one point is well separated (by about 3°) from the straight line. This point corresponds to a phase angle of $\pi/2$, for which it will be necessary to find a null value from the r.m.s. value of the voltage.

For the value $\Phi=\pi/2$, the light flux received by the electron photomultiplier is no longer modulated. Furthermore, for a continuous flux, the presence of spurious signals of a certain amplitude has been noted on an oscilloscope. These spurious effects disappear as soon as the flux is slightly modulated.

An inspection of the graphical representation of Table II will show that this error becomes nil for nearby points corresponding to the phase angles of 82° and 97°. It is therefore only for points very close to 90° that the readings are subject to error caused by noise. This error of 3 percent corresponds to 1/100th of a fringe which is 4 percent in relative value. For a phase angle of $3\pi/2$, the absolute error would still remain 1/100th of a fringe, thus giving only a relative error of 1 percent.

As described above, the voltage read on the DC voltmeter is held constant by means of a rheostat. Measurement is made on the AC voltmeter of the r.m.s. value of the voltage $V$, for various orientations of the polarizer P. As described previously, the orientation $\alpha$ of the axes with respect to a reference direction is such that for two symmetrical positions of the polarizer with respect to the reference direction, the r.m.s. value of the voltage $V$ is the same. One can also obtain the cosine of the phase angle by finding the ratio of the minimum and maximum values of the alternating voltage.

$$|\cos \varphi| = \frac{V_{\min.}}{V_{\max.}}$$

It is possible therefore to measure experimentally in every point of a model the orientation $\alpha$ of the axes and the phase angle $\Phi$.

Let $N_1$ and $N_2$ be the two main stresses in a point M with the convention $N_1$, $N_2$ in algebraic value. Let $\alpha$ be the angle of $N_1$ with the reference direction, $x$ for example (see FIG. 16).

$$\alpha = \overrightarrow{Mx} \cdot \overrightarrow{N_1}$$

Let also $X$ and $Y$ be the perpendicular stresses in M and let T be shear stress in a system of coordinates $x$ and $y$.

The equilibrium equation in point M will be:

$$\frac{\partial X}{\partial x} + \frac{\partial T}{\partial y} = 0 \qquad (a)$$

$$\frac{\partial T}{\partial x} + \frac{\partial Y}{\partial y} = 0 \qquad (b)$$

It is known that:

$$T = \frac{\lambda}{2}(N_1 - N_2) \sin 2\alpha = \frac{\lambda}{2} \varphi \sin 2\alpha$$

The angles $\Phi$ and $\alpha$ being known experimentally, the value of T will be known in every point of the model, as well as its derivatives with respect To $x$ and $y$. T is measured in the same unit as $\Phi$.

From the first equilibrium equation given above, there is obtained by integration along a line parallel to $Mx$, the perpendicular stress $X$.

The second equilibrium equation permits, by integration along a parallel to $My$, the determination of the perpendicular stress $Y$.

On the other hand, in each point it is easy to compute $Y$ knowing $X$ or $X$ knowing $Y$, since:

$$X = N_1 \cos^2 \alpha + N_2 \sin^2 \alpha$$
$$Y = N_1 \sin^2 \alpha + N_2 \cos^2 \alpha$$

Let:

$$X - Y = (N_1 - N_2)\cos 2\alpha = \varphi \cos 2\alpha$$

It is therefore possible theoretically to determine at every point of a model, the value of $x$ and $Y$. It is therefore very easy to determine the values of $N_1$ and $N_2$ since $$\left. \begin{array}{l} N_1 - N_2 = \varphi \\ N_1 + N_2 = X + Y \end{array} \right)$$

Experimental Methods for Determining the Stresses

There will now be derived the values of $\alpha$ and $\Phi$, at the corners of squares formed by lines drawn parallel to the axes $Ox$ and $Oy$, as shown in FIG. 17. It should be noted that this method of measurements permits the determination of the orientation of the stresses to an accuracy of only $\pi/2$. The exact value of $\alpha = \overrightarrow{Mx} \cdot \overrightarrow{N_1}$ may be found by continuous extrapolation from the side of the model where the stresses are known.

One point of this set of squared lines may be defined by means of two indices, for example $M_k{}^k$, where $k$ represents a column and $j$ a row, as shown in FIG. 17.

If the distances between the row and columns are sufficiently small, the equations $(a)$ and $(b)$ may be written in the form of finite differences for example for point $M_{jk}$:

$$\frac{X_k^j - X_{k-1}^j}{x_k - x_{k-1}} + \frac{T_k^{j+1} - T_k^{j-1}}{y^{j+1} - y^{j-1}} = 0 \qquad (c)$$

$$\frac{Y_k^j - Y_k^{j-1}}{y^j - y^{j-1}} + \frac{T_{+1}^j - T_{k-1}^j}{x_{k+1} - x_{k-1}} = 0 \qquad (d)$$

Knowing $x_{k11}{}^j$, equation $(c)$ gives $x_k{}^j$ and knowing $y_k{}^{j11}$, equation $(d)$ gives $y_k{}^j$.

The perpendicular stresses can therefore be determined in every point. It merely suffices to know their values in any one point. This will generally be the case at the start for any point of a contour.

From the values of $X$ and $Y$ at this point, it is possible to find the stresses at every other point, the path of integration being an absolutely arbitrary path.

The equations $(c)$ and $(d)$ may be written as follows from the experimental values obtained:

$$\frac{X_k^j - X_{k-1}^j}{x_k - x_{k-1}} = -\frac{1}{2} \frac{\varphi_k^{j+1} \sin 2\alpha_k^{j+1} - \varphi_k^{j-1} \sin 2\alpha_k^{j-1}}{Y^{j+1} - Y^{j-1}} \qquad (e)$$

$$\frac{Y_k^j - Y_k^{j-1}}{y^j - y^{j-1}} = -\frac{1}{2} \frac{\varphi_{k+1} \sin 2\alpha_{k+1} - \varphi_{k-1} \sin 2\alpha_{k-1}}{x_{k+1} - x_{k-1}} \qquad (f)$$

To these equations it is necessary to add the following $$x_k{}^j - y_k{}^j = \Phi_k{}^j \cos 2\alpha_k{}^j \qquad (g)$$

The right-hand side of the equations $(e)$, $(f)$ and $(g)$ are derived from the experimental values.

The equations $(e)$, $(f)$ and $(g)$ constitute, therefore, a system of linear equations to be solved.

As the solution of the equations $(e)$, $(f)$, and $(g)$ is relatively time consuming, it is preferable in practice to use an appropriately programmed general purpose electronic computer.

Example

By way of example, the determination of the orientation of the axes and of the phase angle of a model comprising a thick annulus of methyl polymethacrylate subjected to tensile stress has been made. The inside diameter of the annulus is 65 mm. and the outside diameter is 135 mm. In this case, the squared lines of FIG. 17 would be spaced by 5 mm.

The experimental results are given on FIG. 18. The values for $\alpha$ and $\Phi$ at the edges of the material have been obtained by extrapolation.

By way of example, integration has been made by starting from point A (FIG. 18) which is a singular point where $N_1 = N_2 = X = y = 0$ and the value of the stresses in point B has been looked for ($N_1 = 0$, $N_2 = -67°$) by passing through the following points:

A  $M_{11}{}^{10} M_{11}{}^8 M_{11}{}^6$  $M^7{}_{11}$  $M^6{}_{11} m_{11}{}^5 m_{12}{}^5 m_{13}{}^5 14^5$  B

The computation leads to the following values:

$$N_{1B} = -0.28 \text{ degrees instead of 0 degrees}$$

$$N_{2B} = -67.28 \text{ degrees instead of 67 degrees}$$

It is therefore seen that the experimental results are quite close to the computed values.

These values determined for $\alpha$ and $\Phi$ have been made under nonperfect conditions since the system for controlling and regulating the DC voltage hereinafter described, was not used. The measurements, therefore, could not be obtained to an accuracy much better than about 0.5°. There was, nevertheless, a good coincidence with the experimental values of the direct measurement of the stresses.

It will be seen that with a suitable step for the integration with respect to the gradient of variations of $\alpha$ and of $\Phi$, the process according to the present invention leads to excellent results.

In order to use the method of scattered light with a nonpolarized impinging light beam, in three-dimension photoelastic measurement, it has been necessary to make a complete theoretical study of the action of a plurality of birefringent elements upon a light vibration.

On the basis of this theoretical study, it has been possible to evolve a new method for determining the axes and the phase shift of a birefringent element. This new method is both quick and precise.

The light energy transmitted by scattering is very small, being proportional to the energy received by the scattering particles. It is therefore necessary to increase to a maximum the illumination of the point to be studied in the model, account being taken of the physical properties of the scattered light. First, some of these properties will be discussed and then their influence upon the measurements of the orientation and of the phase angle of the opening and the thickness of the light beam illuminating the point will be considered in the model. An illustrative optical device used in the measurements and the results obtained on a model subjected to compressive stresses will then be described.

Physical Properties of Scattered Light

Let us consider a beam of natural light propagated in the direction Ox in FIG. 19. At O, the vibrations of the light may be resolved into two noncoherent perpendicular vibrations having the same amplitude $A$, one being directed along Oy and the other along Oz.

Let us consider the state of vibration of the scattered light in a direction $OM$ of the plane $xOz$, inclined by an angle $\alpha$ with respect to the impinging direction. The vibration $y$, parallel to Oy at point M, where $OM=r$, has an amplitude a defined by $$a = C \frac{A}{r}$$

wherein C is independent of $\alpha$.

The vibration $Z$ perpendicular to $OM$, located in the plane $xOz$ has an amplitude $$a \cos \alpha.$$

The scattered light in any direction is therefore only partially polarized. Only the light scattered in a direction perpendicular to the impinging beam is totally polarized, since then $$\alpha = \frac{\pi}{2}$$

and $$a \cos \alpha = 0.$$

The vibrations $Y$ and $Z$ are noncoherent.

On the other hand, it is obvious that for a given scattering volume, the flux scattered in a direction will vary directly with the impinging flux.

However, with a light source of given intensity, it is not possible to increase the impinging flux except by increasing the opening of the beam illuminating the scattering volume.

Influence of the Opening and of the Thickness of the Light Beam

Influence of the opening of the light beam.

The above-described process, assumed that the model was illuminated by a beam of parallel light. The light scattered in the direction of observation, was therefore assumed to be totally polarized. If now the model is illuminated by a beam of converging light, the light scattered in the direction of observation is only partially polarized. It is therefore necessary to study the influence of the state of partial polarization upon the principles for measuring the orientation of the axes and of the phase angle, described above.

Let us suppose a birefringent model having $ox$ and $Oy$ for axes receives partially polarized light. The vibrations of this light may be resolved into two perpendicular noncoherent vibrations, $X$ and $Y$, having for intensities $A^2$ and $a^2$. At the output of the rotating analyzer, the vibration $X$, with intensity $A^2$, will give rise to a modulated energy $$E = A^2 \left[ 1 + \frac{1-\tau_1^2}{1+\tau_1^2} \cos 2(\Omega t - \beta_1) \right]$$

wherein $\tau_1$ is the flattening coefficient of the ellipse of light due to the vibration $X$, and $\beta_1$ is the angle of the axes of this ellipse with respect to the axes $Ox$ and $Oy$. The vibration $Y$, with intensity $e^2$, will give rise to a modulated energy $$e = a^2 \left[ 1 + \frac{1-\tau_2^2}{1+\tau_2^2} \cos 2(\Omega t - \beta_2) \right]$$

wherein $\tau_2$ is the flattening coefficient of the ellipse of light due to the vibration $Y$, and $\beta_2$ is the angle of the axes of this ellipse with respect to the axes $Ox$ and $Oy$.

The plane according to the above-mentioned Poincare representation permits the immediate deduction that the two perpendicular vibrations will rise to two ellipses having the same flattening coefficient and whose axes are displaced by $\pi/2$.

Therefore:

$$\tau_2 = \tau_1$$

and $$\beta_2 = \beta_1 + \frac{\pi}{2}$$

Hence:

$$E = A^2 \left[ 1 + \frac{1-\tau_1^2}{1+\tau_1^2} \cos 2(\Omega t - \beta_1) \right]$$

$$e = a^2 \left[ 1 - \frac{1-\tau_1^2}{1+\tau_1^2} \cos 2(\Omega t - \beta_1) \right]$$

Let:

$$E + e = A^2 + a^2 + (A^2 - a^2) \frac{1-\tau_1^2}{1+\tau_1^2} \cos 2(\Omega t - \beta_1)$$

The R.M.S. voltage read on the AC voltmeter is therefore proportional to $$(A^2 - a^2) \frac{1-\tau_1^2}{1+\tau_1^2}$$

The above-described principle for measuring the orientation of the axes and the phase shift of a BIREFRINGENT element remains entirely valid.

Since the state of polarization has no influence upon the principles of this invention, there only remains to be examined the case of scattered light wherein the divergence of the light beam renders the quantity $A^2 - a^2$ a maximum.

Let O be the point studied in the model observed from a direction Oy.

Let $\alpha_0$ be the divergence of a light cone the axis of which is $Oz$ and the solid angle of which is $\Omega = 2\pi 1 - \cos\alpha O)$, at the point of illumination O. The energy received at point O is proportional to the solid angle $\Omega$.

Let us consider a light ray inside this cone (FIG. 21) defined by the angles $\alpha$ and $\Theta$ as well as the solid angle $d\Omega$ defined by $$d\Omega = \sin\alpha \cdot d\alpha \cdot d\Theta.$$

Let Ou be the intersection of the plane containing the impinging wave and the plane $xOy$. Let Ov be the direction of the plane of the wave perpendicular to Ou.

The vibrations of the impinging light may be resolved into two noncoherent vibrations along the axes Ou and Ov, the intensities of which are:

$$u^2 = {}^2 d\Omega$$

$$v^2 = {}^2 d\Omega.$$

Let us look for the state of polarization of the light scattered at point O in the direction Oy.

Let $x$ and $z$ be the components of the vibration scattered along the directions Ox and Oz perpendicular to Oy. The equations below then apply, namely:

$$x^2 = {}^2{}_x = v^2{}_x$$

$$z^2 = {}^2{}_z + v^2{}_z$$

$u_x, v_x, u_z,$ and $v_z$ being the components of the vibrations $u$ and $v$ along the directions Ox and Oy.

The following equations also apply:
$u_x{}^2 = I'^2 \sin^2\Theta d\Omega$
$u_z{}^2 = 0$
$v_x{}^2 = I'^2 \cos^2\alpha \cos^2 b K d\Omega$
$v_z{}^2 = I'^2 \sin^2\alpha d\Omega$ in which $I'^2 = K^2 I^2$, $k^2$ being the scattering coefficient.

Hence:

$$x^2 = I'^2 [\cos^2 \alpha \cos^2 \theta + \sin^2 \theta] d\Omega$$
$$z^2 = I'^2 \sin^2 \alpha \, d\Omega$$

Let us consider now the whole of the cone of opening $\alpha_0$, the components along $Ox$ and $Oz$ of the scattered vibration have intensities $A^2$ and $a^2$ such that:

$$A^2 = \int_\Omega x^2$$
$$= \int_0^{2\pi} \int_0^{\alpha_0} I'^2 [\cos^2 \alpha \cos^2 \theta + \sin^2 \theta] \sin \alpha \cdot d\alpha \cdot d\theta$$

$$a^2 = \int_\Omega z^2 = \int_0^{2\pi} \int_0^{\alpha_0} I'^2 \sin^2 \alpha \cdot \sin \alpha \cdot d\alpha \cdot d\theta$$

Let:

$$A^2 = \pi I'^2 (1 - \cos \alpha_0) \left[ 1 + \frac{1 + \cos \alpha_0 + \cos^2 \alpha_0}{3} \right]$$
$$a^2 = 2\pi I'^2 (1 - \cos \alpha_0) \left[ 1 - \frac{1 + \cos \alpha_0 + \cos^2 \alpha_0}{3} \right]$$

Let us now determine the value of the angle $\alpha_0$ which maximizes the quantity $A^2 - a^2$.

Now:

$$A^2 - a^2 = \pi I'^2 \sin^2 a \alpha_0 \cos \alpha_0.$$

This quantity is maximum for the value $$2\sin\alpha_0\cos^2\alpha_0 - \sin^3\alpha_0 = 0.$$

Let:

$$\tan \alpha_0 = \sqrt{2}$$

Thus:

$$\alpha_0 \cong 55°.$$

A feature therefore of the present invention is to open to the maximum value the cone of light illuminating point O.

It is important to note that this is possible in this invention since measurement is made only of energy and of the flattening of the ellipse of light. It would not be possible to open the light beam too much in any of the prior art Techniques, since this extra opening would introduce partial polarization of the scattered light.

Influence of the thickness of the light beam. (FIG. 22)

Let us note first of all that the law of images in geometrical optics gives the equation:

$$n^2 \cdot ds \cdot d\Omega = n'^2 \cdot ds' \cdot d\Omega'$$

in which $n$ and $n'$ are the refraction indices of the object and image spaces, $ds$ and $ds'$ are the dimensions of the object and image spots, $d\Omega$ and $d\Omega'$ are the solid angles in the space object and in the space image.

Therefore, for a given light source of known dimensions and known intensity, a reduction of $ds'$ is obtained by increasing $d\Omega'$. This is important since $ds'$ Represents the thickness of the beam limiting before and after displacement of the birefringent element under study inside the model. The process described above comprises in determining the orientation $\Theta_1$ and the phase angle , of the birefringent blade placed in front of the plate for which the orientations $\Theta_2$ and $\Theta_3$ and the phase angles $\Phi_2$ and $\Phi_3$ defined by this birefringent plate are known.

Let us suppose now that $\Theta_1 = \Theta_2$. It is known in fact that if all the elements constituting the birefringent element $\Phi_2\Theta_2$ have different axes, when the load is varied, $\Theta_2$ varies whereas $\Theta_1$ remains constant. It is therefore possible by varying the load to attempt to obtain $\Theta_1 = \Theta_2$, thus involving obviously $\Theta_3 = \Theta_1$. One may ascertain this fact by moving the light beam in the thickness of the birefringent element defined by $\Phi_1\Theta_1$.

Let us locate the light beam tangentially to the birefringent element $\Phi_2\Theta_2$ and let $2\delta$ be the phase angle corresponding to the thickness of the light beam. Let be the phase angle of the assembly comprising the small birefringent element $\Phi$ and the birefringent element $\Phi_2\Theta_2$.

One may assume that the energy $E$ of the beam is concentrated in $2n+1$ planes numbered from $-n$ to $+n$, thus cutting the beam into $2n$ equal slices.

Let us look for the value of the phase angle measured Experimentally.

The light concentrated over the plane $k$ traverses a birefringent element whose angle is $$\Phi \frac{k\delta}{n};$$

$k$ being located between $-n$ and $+n$.

Let us assume that cos $$\left( \Phi + \frac{k\delta}{n} \right)$$

does not change its sign when $k$ varies from $-n$ to $+n$. The phase angles measured will be the weighted sum of the phase angles corresponding to the various planes. Let $$\cos \Phi^\Phi = \frac{1}{2n+1} \sum_{-n}^{+n} \cos\left( \Phi + \left(\frac{k\delta}{n}\right) \right)$$

If $\delta$ is small (for example $\delta < 10°$), one may write:

$$\cos\left( \Phi + \frac{k\delta}{n} \right) = \cos \Phi - \frac{k\delta}{n} \sin \Phi - \frac{k^2\delta^2}{2n^2} \cos \Phi$$

Let us associate, two at a time, the planes $+k$ and $-k$:

$$\frac{1}{2n+1} \sum_{-n}^{+n} \cos \left( \Phi + \frac{k\delta}{n} \right) = \frac{1}{2n+1} \bigg[ (2n+1) \cos \Phi$$
$$- = \frac{\delta^2}{n^2} \cos \Phi (1^3 + 2^3 + 3^3 + \cdots + n^3) \bigg]$$

Thus, there is obtained when $n$ increases to infinity:

$$\cos \Phi^\Phi = \cos \Phi \left[ 1 - \frac{\delta^2}{6} \right]$$

or $$\cos \Phi = \cos \Phi^\Phi \left[ 1 + \frac{\delta^2}{6} \right]$$

To determine the characteristics of a plate, one must therefore successively place the middle of the light beam on each one of the faces of the plate, the model having been stressed appropriately so that $\Theta_2 = \Theta_1$.

Afterwards, it is possible to correct the value of the measured phase angle if the width of the light beam is known, that is to say, by knowing an approximate value of $\delta$.

Description of an Illustrative Device

In the nonlimiting illustrative embodiment of the present invention, the light source S is a mercury vapor lamp OSRAM type HBO 100 W. The source was chosen due to its small dimensions (interelectrode distance = 0.25 mm.) and its very strong luminance (170,000 stilbs).

The lenses $L_1$ and $L_2$ form an image of the light source on the diaphragm $D_1$ which passes only the luminous spot formed by the arc and eliminates the image of the glass bulb. Diaphragm $D_1$ is placed at the focus of lens $L_3$.

The intensity of the light traversing iris diaphragm $D_2$ can be controlled by adjusting the diaphragm.

The light is then reflected by a totally reflecting prism P, which is used in preference to a mirror in order to avoid polarization by reflection.

The lens $L_4$ forms an image of the light source on the point of the model M to be studied. The model is placed in a tank which is filled with a liquid having the same index of refraction as the model.

The scattered light is observed in the direction perpendicular to the axis Y'Y of the impinging light beam. The wall of the reservoir through which passes the scattered light must be perfectly free from the phenomenon of birefringence.

Two holes $T_1$ and $T_2$ define the observation axis. The scattered light traverses an interferential filter, a rotating analyzer A and enters into the electron photomultiplier C.

The displacement of the impinging light beam is obtained by displacing along the axis X'X the assembly prism P and lens $L_4$.

The model may be rotated about the observation axis RR', and this is, in effect, rotating the direction of the main stresses with respect to the direction of polarization.

Finally, for passing from the point being studied to another point, the model may be moved, on the one hand, along the axis Y'Y and, on the other hand, along the axis Z'Z perpendicular to the plane of the drawing.

Experimental Results

Experiments were made on samples having dimensions of 30×30120 mm., subjected to various degrees of compression.

These experiments were made as follows:

For a given load, the model was rotated about the observation axis. This had the same effect as varying the orientation of the stresses with respect to the direction of polarization, which is fixed. For each position of the model, the r.m.s. value of the voltage read on the AC voltmeter was noted and, as has been seen previously, this voltage is proportional to $$\frac{1-\tau^2}{1+\tau^2} = \sqrt{1-\sin^2 2\theta \sin^2 \varphi}$$

where:

$\tau$ is the coefficient of flattening of the ellipse of light at the output of the model, $\Theta$ is an angle made by the direction of polarization with one of the axes of the birefringent element and, $\Phi$ is the phase angle of the birefringent element.

The absorption varying during this rotation, the total light flux emitted by scattering and measured on the DC voltmeter must be kept constant. It is for this purpose that use is made of the iris diaphragm mentioned above. It has been ascertained that the variation thus obtained in the opening $\alpha_0$ of the impinging beam has practically no influence on the proportion of polarized light. In effect, the angle $\alpha_0$ is in fact very small (about 3°). A computation from the above relations leads to:

$$dy/y = -2\alpha_0 \alpha_0$$

$y$ being the amount of polarized light.

The experiments were performed on a model made of methyl polymethacrylate photoelastic.

The scattering coefficient for the substance tested is small. For substances having larger scattering coefficients it will be necessary to employ electronic device of higher quality in order to diminish the influence of the background noise of the electron photomultiplier on the measurement of the r.m.s. value of the output voltage.

To improve the signal-to-noise ratio, a vacuum tube selective filter tuned at twice the rotation frequency of the analyzer is placed before the AC voltmeter. This filter has a double advantage:

It eliminates a large part of the background noise at the input to the AC voltmeter since the latter is proportional to the r.m.s. of the band-pass;

It acts as a signal amplifier.

It is unnecessary to use an interferential filter due to the fact that the maximum of scattering as well as the maximum sensitivity of the electron photomultiplier both occur in the blue part of the spectrum.

FIG. 24 shows the variation of the r.m.s. AC voltage (—and at the end of the line insert—) which is proportional to $$\frac{1-\tau^2}{1+\tau^2}$$

as a function of the orientation of the model. This curve is perfectly symmetrical and shows that the axes of the birefringent element correspond exactly to the position $\Theta=0$.

The axes of the birefringent element thus having been determined, a study was made of the variation of the phase angle, as a function of the load, according to the process described above.

The results are shown on FIG. 25. The experimental points diverge from a straight line at a maximum of 2°, that is 1/200 of a fringe, thus yielding a very high degree of precision on the variation of the phase angle as a function of the load. Two points which diverge most from the straight line are located on either side of the value $\Phi=100°$.

The precision may be further improved by:

Use of a more stable power source,

Precisely controlling the frequency of rotation of the analyzer and precisely centering the selective filter on double this frequency, in order to be able to employ a narrow band-pass optical filter.

Use of known means for decreasing the background noise of the electron photomultiplier.

The material used for making the model must have a rather small photoelasticity sensitivity. It must be very pure and transparent. A small coefficient of scattering is not an impermissible condition since a high degree of transparency permits the use of models having large dimensions.

In this invention, measurements are of the same order of magnitude as in the prior art. However, in order to reduce the duration of these measurements means are employed to keep the r.m.s. value of the modulated current at the output of the electron photomultiplier. The value of the DC voltage is proportional to this r.m.s. value.

It has been seen above that for determining the direction of the stresses in a model under load, it merely suffices to measure the different alternating currents at the output of the electron photomultiplier, as a function of the orientation of the incident vibration, with the DC voltage being kept constant.

Although a manually adjusted rheostat can be used to keep the DC voltage constant, it is advantageous to employ automatic regulation of the DC voltage, thereby eliminating voltage fluctuations having as their origin either a lowering or an increase in the intensity of the mercury vapor light source, or resulting from variations in the absorption path of the light beam.

Description of the Electronic Controlling System

The diagram of the elements of the device is shown in FIG. 26.

The controlling feedback system shown in FIG. 26 comprises a light source such as an arc lamp LA, the light beam of which is directed onto an optical system SOAV whose absorption is variable. At the output the light beam impinges on the cathode of an electron photomultiplier PM. the average potential at the output of the electron photomultiplier (or part of this potential) is compared to a constant but adjustable reference potential TR. These two voltages are applied to a differential amplifier AD, the output of which is limited by limiters L and the applied to a power amplifier AP controlling the light source LA.

Use of this control scheme raises two further problems:

One problem is that the voltage delivered by the electron photomultiplier comprises both an AC voltage and of a DC voltage, the ratio of the amplitudes of which can vary from 0 to 1. It is therefore necessary to adjust the DC voltage without affecting this ratio.

A second problem is that it is necessary to provide an output for measuring the AC voltage and also to introduce voltage limiters in the loop in order not to switch-off or overload light source LA.

Gain in the Loop

Let $V_e$ be the reference voltage and $V_s$ the average value of the voltage delivered by the electron photomultiplier. The difference of the two voltages is the so-called error voltage.

The gain under DC conditions in the loop is defined by $$\frac{Vs}{V} = kc.$$

Due to the presence of elements with variable absorption in the optical path, the gain of the loop will be a function of $V_s$ where the gain of the amplifiers remains constant.

Considering the required precision and voltages normally used, the amplifier gain might range from 100 (for an input $V_s$ of 1,000 mV.) to a gain of 1,000 (for an input $V_s$ of 100 mV.).

Under these conditions, the gain of the loop will be sufficiently large so that a stability greater than $10^{12}$ for the DC voltage will be insured.

If the two values of amplifier gain can readily be switched, the greater value can be used when scattered light is employed. The switching simultaneously influences the maximum DC value read on the voltmeter.

The swing of the amplifier should be be in the order of 100 V., brought to the input, or 1 percent 10 mV. of the minimum reference voltages with which one should work.

Effect of modulation

Any modulation existing in the signal must be suppressed in the control loop as the current supplied to the lamp must be a direct current.

A computation, which becomes complicated in the presence of modulation rendering the control loop nonlinear, shows that to obtain true AC voltages to an accuracy of less than 1 percent, it is necessary that the ratio of the gain of the loop, on the one hand under DC conditions and, on the other hand at the modulation frequency, be equal at least to $10^4$. Thus, it will be seen, that it is necessary to filter the signal while preserving the modulation for the required AC measurements.

FIG. 27 shows a tridimensional photoelasticity measuring apparatus according to this invention.

The mechanical part of the apparatus comprises a rigid cast aluminum frame 1 (inside dimensions 953×1,128 mm.). This frame is supported by four adjustable legs two of which, 2 and 3, are visible on FIG. 27.

The purpose of this frame 1 is to receive the entire optical and observation system which, as shown on FIG. 27, are mutually perpendicular. The point of contact of the corresponding two axes is the point to be studied in the model. The model is fitted into a tank 4 which is filled with a liquid having the same index of refraction as the model.

The impinging beam is produced by a light source 6 associated with an objective lens 7 supported on a bracket 8 fixed at 9 to the frame 1. The impinging beam 9 is concentrated by an optical system 10 onto a selected point of the model under test. The light scattered by said point is taken along the observation axis, which is perpendicular to the impinging axis. The light scattered by the point under consideration is concentrated by an objective lens 11 and passes through a tube 12 containing a slit. A diaphragm is associated with a quarter wavelength plate 13. A constantly rotating analyzer 14 is provided to receive the scattered light. The light outgoing from the said analyzer 14 is received by photomultiplier 15 which may be of the EMI 6256 S type. The output leads are shown at 16. The rotating analyzer 14 and the photomultiplier 15 are supported on a bracket 17 mounted on the frame 1 at 18.

The model, which may be made of glass, plexiglass, resin, etc., is mounted in a supporting means which can slide up and down along a rail 19'. The top extremity of the rail 19' is supported in a carriage 20 which can move parallel to the side of the additional frame 21. Frame 21 is of sufficiently rigid construction to permit the required precision for the determination of the position in space of the point under experiment of the tridimensional model.

The controls 22 operate the corresponding rack gearing so as to adjust the position of the model to any point in the plane of the additional frame 21 and also to displace this plane parallel to itself.

Through a suitable tangential gear 24, control 23 permits the additional frame 21 to rotate about the axis of the observation beam passing through tube 12.

The operation of the device shown in FIG. 27 is as hereinbefore described.

The light source consists of a very high luminosity mercury vapor lamp supported so as to be adjustable in position according to three mutually perpendicular axes. An adjustable condenser and diaphragm as well as a a focusing lens may be provided. The image of the scattering light created inside the model, about the point of interest is formed on a slit of adjustable width by a fixed optical system.

The rotating analyzer revolves at a speed of about 400 r.p.s. A filter may be provided after the analyzer to select a narrow band of light which is then applied onto a sensitive photomultiplier.

If required, a movable quarter wave plate can be placed in front of the slit.

The signal, resulting from the photomultiplier, is an undulating current whose average value is proportional to the luminous energy of the ellipse of light:

$$E = \frac{a^2+b^2}{2}\left[1+\frac{1-\tau^2}{1+\tau^2}\cos 2\alpha\right]$$

as noted before.

The amplitude of the alternating part of this signal is linked to the flattening $\tau$ of the said ellipse of light while its phase relative to a reference system linked to the rotation of the analyzer permits to fix in space the position of the axes of the ellipse of light.

Additional control means may be provided to make sure that the average value of the said signal is kept constant.

The reading of the said values of the voltage may be made by means of a so-called ratiovoltmeter known in the art.

By making the model rotate around the observation axis, one can determine, on the one hand, the birefringent axes with a precision of the order of 1/10th of a degree, on the other hand, a phase difference within 1/1000th of a fringe, simply by reading the numerical voltmeter.

One can thus tell, in a few seconds, the birefringent state of plates whose thickness is of the order of 1 mm., selected inside any transparent body.

Utilization of the results, that is, the separation of stresses, can be effected manually, or by means of a simple digital computer.

Such a computer would operate according to a program derived from the equations given hereinbefore, thus obtaining directly the values of the stresses in the point of the model under measurements.

Conclusions

This invention discloses the measurment of a form of light. The knowledge of this form of light permits the determination of the characteristics of a series of a birefringent media, the form of light at the input being known. The model can be rotated about the direction of observation. The latter must, in addition, possess the necessary degrees of freedom for permitting the study of any of its points and in any of the desired planes.

The emerging beam perpendicular to the axis of the incident beam is limited for example by two holes $T_1$ and $T_2$. It traverses a rotating analyzer A and, if the nature of the substance constituting the body necessitates it, a monochromatic filter F. The beam enters into a photomultiplier C.

Due to the rotation of the analyzer, the voltage available at the terminals of a resistance placed between the anode of the photomultiplier and the ground, is the sum of a constant voltage and of an alternating voltage.

The constant voltage, directly linked to the light energy transmitted by scattering at the lit point of the body or model must be kept constant during the determination of the state of polarization. In particular, it cannot be affected by the rotation of the body about the observation axis, or by any cause linked to the source of light. For this purpose, the light intensity transmitted by the source is controlled by a suitable electronic device, in order to compensate for variations.

The R.M.S. value of the alternating voltage is linked in a simple way to the flattening of the ellipse of the scattered light. The measurement of this value for the various orientations of the body about the observation axis permits the determination of characteristics of the birefringent medium which is equivalent to the part of the body traversed by the studied scattered light beam.

The precision is improved by utilizing a selective passband filter centered at twice the rotation frequency of the analyzer.

All these measurments may, it is well understood, be rendered automatic, for example by the use of digital millivoltmeters linked to a printing station.

The invention also describes the application of the electronic device to problems of plane photoelasticity measurement or similar problems such as the study of plates cut from frozen models. In such a case, the measuring device is used in direct light and no longer in scattered light.

The illustrative embodiments of the inventive principles herein described may be variously modified and incorporated in other systems and certain details of construction may be variously changed without departing from the scope of the invention.

What We claim is:

1. A photoelasticity-measuring apparatus comprising a supporting frame, nonpolarized light source means, a first optical system mounted onto said supporting frame and containing said light source means, said optical system focusing said nonpolarized light from said source means onto a predetermined point along a lighting axis, supporting means mounted onto said frame being adjustable in three mutually perpendicular directions for supporting a three-dimensional photoelastic model so as to expose predetermined points of said model to said image of said source means, controlling means for rotating said model about an observation axis perpendicular to said lighting axis and forming a a horizontal plane with said lighting axis, said two axes intersecting at said predetermined point of said model, a constantly rotating analyzer centrally located about said observation axis, a photomultiplier positioned along said observation axis, a second optical system mounted onto said supporting frame and containing said analyzer and said photomultiplier and electronic circuit means for separating and simultaneously measuring the DC and AC components of the voltage output of said photomultiplier.

2. A device as set forth in claim 1 wherein said electronic circuit means contains a servomechanism system for maintaining said DC voltage component constant, comprising a constant voltage reference, a differential amplifier, voltages limiters, and a power amplifier, said constant voltage applied to said differential amplifier together with said DC voltage component, and the output of said differential amplifier controlling the gain of said photomultiplier through said voltage limiters and said power amplifier.

3. A device as set forth in claim 1 further including a tank in which said photoelastic model is placed, said tank and a liquid filling said tank having substantially the same index of refraction as that of said model.

4. An apparatus for measuring the mechanical stresses in any point of a three-dimensional light-transparent model, comprising a controlled and stabilized source of nonpolarized light, an optical system focusing a sharp image of said source onto a selected point of said model, means for adjusting the position of said model in space such that said sharp image can be focused onto a number of points within said model, two diaphragms which define an observation axis along which there is provided a constantly rotating analyzer for use with elliptically polarized waves, the polarized light scattered by said point passing through said two diaphragms; a photomultiplier adapted to receive said scattered light after it has traversed said analyzer, electronic means for measuring the magnitude of the AC voltage output from said photomultiplier, whereby the position of the axis and their bisectors as well as the flattening of the ellipse of polarized light coming from the birefringence of said point can be determined and computing means for deriving from said determined values, by mathematical formulas, the mechanical stress at said point.

5. A method for measuring the ratio of the long and short axes (flattening) of the ellipse of polarized light in any point of a flat, two-dimensional model of polarizing material using an optical system, an analyzer, a photomultiplier and a measuring system, comprising the steps of:
   a. focusing an image of nonpolarized light source means onto a predetermined point of said flat model along an optical axis by means of said optical system;
   b. constantly rotating said analyzer about an observation axis perpendicular to said optical axis;
   c. positioning said photomultiplier along said observation axis to receive the output of said analyzer;
   d. measuring the R.M.S. of the AC current output from the photomultiplier wherein the maximum and minimum values correspond to the positions of the axis and the minimum value with respect to the normalized maximum value is a function of the flattening of the ellipse of polarized light in the direction of the observation axis; and
   e. repeating the process after displacing the model along the observation axis by a distance $dx$, the two measurements permitting the determination of the thickness $dx$ of the birefringent, which is perpendicular to the axis of observation.

6. A method as described in claim 5 further including the steps of:
   a. repeating the measuring procedure for three mutually perpendicular and closely related positions of said model thereby forming a small volume within said model; and
   b. computing by known mathematical equations from the results of said measurements, the directions of the main stresses existing in the said volume, as well as the differences of the main stresses.